(12) United States Patent
Jalali

(10) Patent No.: US 11,503,649 B2
(45) Date of Patent: Nov. 15, 2022

(54) UPLINK-INITIATED FAST AND LOW OVERHEAD INITIAL ACCESS FOR MU MIMO SYSTEMS

(71) Applicant: Ahmad Jalali, Rancho Santa Fe, CA (US)

(72) Inventor: Ahmad Jalali, Rancho Santa Fe, CA (US)

( * ) Notice: Subject to any disclaimer, the term of this patent is extended or adjusted under 35 U.S.C. 154(b) by 89 days.

(21) Appl. No.: 16/900,466

(22) Filed: Jun. 12, 2020

(65) Prior Publication Data

US 2021/0392688 A1    Dec. 16, 2021

(51) Int. Cl.
*H04W 74/08*   (2009.01)
*H04W 76/10*   (2018.01)
*H04L 5/00*    (2006.01)
*H04L 1/18*    (2006.01)
*H04W 24/08*   (2009.01)
*H04W 36/30*   (2009.01)

(52) U.S. Cl.
CPC ....... *H04W 74/0833* (2013.01); *H04L 1/1812* (2013.01); *H04L 5/0048* (2013.01); *H04W 24/08* (2013.01); *H04W 36/30* (2013.01); *H04W 76/10* (2018.02)

(58) Field of Classification Search
CPC ............... H04L 5/0048; H04W 24/08; H04W 36/00835; H04W 36/305; H04W 36/36; H04W 36/30; H04W 74/006; H04W 72/042
See application file for complete search history.

(56) References Cited

U.S. PATENT DOCUMENTS

| | | | |
|---|---|---|---|
| 2005/0068230 A1* | 3/2005 | Munoz | H01Q 25/00 342/359 |
| 2006/0098752 A1* | 5/2006 | Song | H04L 27/2601 375/260 |
| 2010/0240367 A1* | 9/2010 | Lee | H04W 36/0077 455/435.2 |
| 2011/0183672 A1* | 7/2011 | Jeong | H04W 36/30 455/436 |
| 2012/0142387 A1* | 6/2012 | Kano | H04W 36/0016 455/509 |
| 2015/0045054 A1* | 2/2015 | Emadzadeh | G01S 5/0242 455/456.1 |

(Continued)

*Primary Examiner* — Ian N Moore
*Assistant Examiner* — Sun Jong Kim
(74) *Attorney, Agent, or Firm* — Parviz Jalali

(57) ABSTRACT

The User Equipment (UE) initiates initial access by transmitting an uplink reference signal on at least one UE beam. Each Base Station (BS) carries out a spatial search of detected uplink reference signals, estimates the Angle of Arrival (AoA) of the uplink reference signals, forms a dedicated downlink beam toward the UE at the estimated AoA, and sends an acknowledgement for the uplink reference signal on the dedicated downlink beam. The UE carries out a spatial search of the received acknowledgement, and identifies the UE beam angular pointing position, from which receives the acknowledgement with the highest signal quality, as the UE beam boresight toward the BS. The UE sends a connection setup request message to the BS on the identified UE beam boresight. The uplink reference signals and acknowledgements comprise a single preamble, effectively carrying one bit of information, or carry a small payload.

13 Claims, 16 Drawing Sheets

(56) References Cited

U.S. PATENT DOCUMENTS

| | | | |
|---|---|---|---|
| 2016/0088648 A1* | 3/2016 | Xue | H04B 7/0452 |
| | | | 370/252 |
| 2018/0063817 A1* | 3/2018 | Chakraborty | H04W 72/042 |
| 2019/0045457 A1* | 2/2019 | Islam | H04W 52/325 |
| 2019/0222384 A1* | 7/2019 | Wu | H04W 72/085 |
| 2019/0349824 A1* | 11/2019 | Tsuda | H04W 36/0027 |
| 2020/0154354 A1* | 5/2020 | Awoniyi-Oteri | H04W 52/0206 |
| 2020/0314709 A1* | 10/2020 | Ly | H04W 72/14 |
| 2020/0314911 A1* | 10/2020 | Lei | H04W 56/00 |
| 2021/0195582 A1* | 6/2021 | Takano | H04W 72/0413 |

\* cited by examiner

UPLINK-INITIATED FAST AND LOW OVERHEAD INITIAL ACCESS FOR MU MIMO SYSTEMS

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present disclosure describes aspects of large MU-MIMO systems comprising a network of Base Stations (BSs) to provide wireless broadband internet access to User Equipment (UEs). The present disclosure describes systems and methods to achieve low delay and low overhead initial network access, low delay and low overhead active and idle-mode handover, low overhead and accurate idle mode beam tracking, accurate UE and BS beam steering, and joint optimization of multiple beams to enhance network throughput.

BACKGROUND OF THE INVENTION

High speed and low delay wireless broadband internet access to User Equipment (UEs) such as smart phones, communications devices for vehicles, and equipment for fixed wireless communications to premises such as houses and enterprises has recently gained attention. Frequency bands from below 7 GHz to mmwave range are being considered for 5G systems and beyond.

5G and future wireless broadband systems aim at providing data rates of as high as 1 Gbps or higher, with low delay and high reliability. Such high data rates are achieved using large Multi-User Multiple Input Multiple Output (MU-MIMO) systems, wherein the BSs form many narrow beams, and each beam is pointed toward at least one UE. These beams have narrow beamwidth (BW), and require joint optimization and accurate pointing to maximize network throughput. Low delay and high reliability require fast UE initial network access, fast beam assignment and pointing by the BSs and the UEs, fast and accurate beam tracking during the data session active and idle modes, and fast active-mode and idle-mode handover. The medium access protocol overhead must also be minimized, while achieving low delay and high reliability.

In conventional cellular systems, such as 3G and 4G, reference signals and control information are broadcast on downlink shared channels, which the UEs use to initiate initial access and carry out active and idle mode handover. The downlink shared control signaling schemes generate high overhead in large MIMO systems with many narrow beams. In this disclosure, a class of uplink-initiated signaling protocols are described. The UE initiates initial access, active and idle mode beam tracking, and handover based on uplink signaling and measurements. The BS sends dedicated control information to the UE on dedicated downlink beams; thereby significantly reducing overhead, significantly increasing the execution speed of the processes, and providing high beam pointing and tracking accuracy.

One technique to achieve high data rate and high network throughput is the simultaneous reuse of the available spectrum on multiple beams generated by a BS. However, reuse of the available spectrum on multiple beams may result in cross-beam interference, reducing the data rate on some beams. This disclosure describes systems and methods for joint beam shaping and beam steering of multiple BS beams, to reduce cross-beam interference in the network.

BRIEF DESCRIPTION OF THE SEVERAL VIEWS OF THE DRAWINGS

Some embodiments of the present invention are illustrated as an example and are not limited by the accompanying figures. In the following figures, where appropriate, similar components are identified using the same reference label.

SUMMARY

Figure 1A:
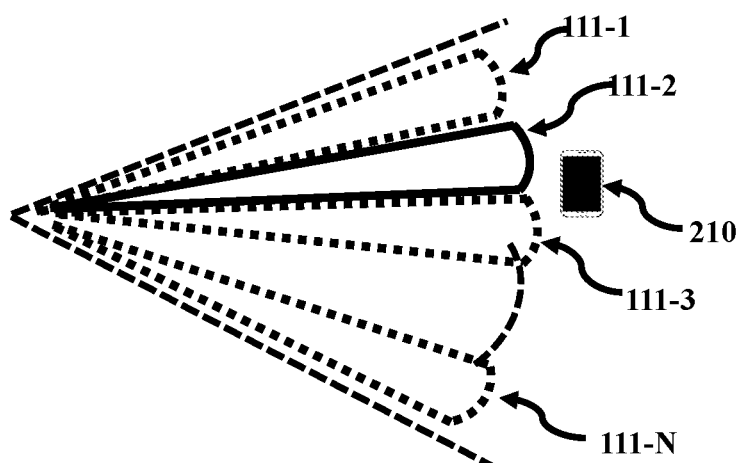
FIG. 1A is a graphical depiction of an example of multiple BS fixed beams in a sector, according to some embodiments.

A network of Base Stations (BSs) provide broadband internet connectivity to UEs. The BSs and the UEs comprise of at least one radio subsystem connected to at least one antenna aperture; each antenna aperture is capable of forming at least one beam. An uplink-initiated initial access system is described, wherein the UE initiates the initial access process by transmitting an uplink reference signal, on a UE beam, to a BS. The BS carries out a spatial search of the received uplink reference signal and estimates the Angle of Arrival (AoA) of the received uplink reference signal at the BS. The BS forms a dedicated downlink beam, referred to as the BS-serving-beam, toward the UE at the estimated AoA, and sends, on the dedicated downlink beam, an acknowledgement for the uplink reference signal.

In some embodiments, the uplink reference signal is comprised of a single preamble spread using a pseudo-noise sequence, effectively sending one bit of information on the uplink to inform the BS that a UE is attempting initial access, thereby generating negligible signaling overhead 100 on the uplink. In some embodiments, the acknowledgement transmitted by the BS also comprises of a single preamble, effectively transmitting one bit to inform the UE that the BS has received the uplink reference signal. Furthermore, the signaling is only sent when a UE is attempting initial access, thereby significantly reducing the downlink overhead.

In some embodiments, the UE transmits the uplink reference signal on an asynchronous 105 random-access channel, without downlink detection or synchronization. In one embodiment, dedicated resources are assigned to the asynchronous random-access channel for transmitting the uplink reference signal. In another embodiment, the uplink reference signal is transmitted as an underlay signal on a set of resources of the asynchronous random-access channel, where the said resources are also assigned to other data or control channels. In another embodiment, the UE receives 110 information on resources of a random-access channel of a first network from a second network, the first and the second networks are synchronized, the UE synchronizes to the second network, and the UE transmits the uplink reference signal on the random-access channel of the first network.

In one embodiment, the UE does a spatial search of the acknowledgement received from the BS, estimates a signal quality of the acknowledgement on multiple UE beam angular pointing 115 positions, and chooses the UE beam angular pointing position on which it receives the highest signal quality as the UE beam with which to communicate with the BS, referred to as the UE-serving-beam. The UE sends a connection setup request message to the BS on the UE-serving-beam, initiating connection setup with the BS.

In one embodiment, the UE is capable of forming more than one beam, the UE 120 sequentially transmits an uplink reference signal on one UE beam at a time, waits for an acknowledgement from the BS, estimates the signal quality of each received acknowledgement until an uplink reference signal has been transmitted on each UE beam, chooses the UE beam on which an acknowledgement with the highest signal quality is received, and designates the UE beam on which the highest signal quality is received as the UE-serving-beam.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, as the scope of the invention is best defined by the appended claims. Various inventive features are described below that can each be used independently of one another, or in combination with other features.

A network of Base Stations (BSs) provide broadband internet connectivity to UEs. Each BS/UE comprises of at least one radio subsystem connected to at least one antenna aperture, each antenna aperture is further comprised of at least one row and at least one column of antenna elements, the radio subsystem is capable of forming multiple simultaneous beams, and the radio subsystem enables each antenna aperture to form at least one beam within the sector covering the azimuthal and elevation angular view of the antenna aperture. Each BS beam is assigned to at least one UE. The BSs may be installed terrestrially, on aerial platforms such as drones, or on satellites. An exemplary terrestrial BS comprises of four antenna apertures to cover 360 degrees in azimuth, where each antenna aperture covers a sector of 90 degrees in azimuth.

Abbreviations and terminology definitions are described where they appear first in the disclosure. Herewith, a glossary of the abbreviations and definitions are provided for easy reference:

AoA: Angle of Arrival of signals at a UE from a BS, or at a BS from a UE;

UE-to-BS-AoA: AoA of the signals received at a BS from a UE, with respect to a BS reference direction;

DLSRS: DownLink Shared Reference Signal—sent by BSs, and used by UEs for synchronization, channel impulse response estimation, and signal quality measurement;

DLSCCH: DownLink Shared Control CHannel—used by BSs to send control and system parameter information to UEs within a sector;

DLDRS: DownLink Dedicated Reference Signal—sent by a BS to one UE, and used by the UE for synchronization, channel impulse response estimation, and signal quality measurement;

DLDCCH: DownLink Dedicated Control CHannel—used by a BS to send control and system parameter information to one UE;

ULAP: UpLink Access Probe—transmitted by a UE, and searched by the BSs to estimate the UE-to-B S-AoA;

ULAP-ACK: the acknowledgement sent to the UE by a BS when the BS detects a ULAP;

ARACH: Asynchronous Random-Access CHannel—an uplink random access channel on which UEs transmit ULAP without synchronizing to the downlink;

ULRP: UpLink RACH Probe—has the same utility as that of ULAP, but ULRP is transmitted on the RACH;

ULRP-ACK—an acknowledgement sent to the UE by a BS when the BS detects a ULRP;

ULCS: UpLink Connection Setup—a message sent by a UE to a BS requesting to set up a data connection;

ULCS-ACK: an acknowledgement sent to a UE by a BS when the BS receives a ULCS;

LTI: Listen Time Interval—a time interval during which a UE waits to receive a ULAP-ACK/ULRP-ACK before retransmitting the ULAP/ULRP;

ULCM: UpLink Confirmation Message—a message sent by a UE in response to the ULCS-ACK to complete the connection set up;

Serving-BS: the BS with which a UE is communicating;

UE-serving-beam: the UE beam on which the UE transmits/receives to/from a BS;

BS-serving-beam: the BS beam on which the BS transmits/receives to/from a UE;

DLTP: DownLink Tracking Probe—periodically transmitted by a BS to a UE during idle mode to initiate the update process for UE-to-B S-AoA, B S-serving-beam, and UE-serving-beam;

DLTP-PTI: DLTP Periodicity Time Interval—time interval between periodic transmission of DLTP by BSs during idle mode;

DLTP-WTI: DLTP Wait Time Interval—length of time a UE in idle mode waits to receive DLTP before timing out and initiating idle handover;

ULHP: UpLink Handover Probe—a reference signal transmitted by UE for uplink signal quality measurement during handover;

ULHM: UpLink Handover Message—the message a UE sends to a BS to initiate handover;

STI: Sleep Time Interval—time interval boundaries where a BS may begin data transmission to a UE during idle mode, and when the UE wakes up to search for DLTP;

neighbor-set: the set of BSs whose propagation loss to a UE is below a threshold;

handover-candidate-set: the set of BSs whose signal quality is received at a UE above a threshold handover-BS: the BS to which a UE is handed over when handover procedure is initiated.

Examples of signal quality are received signal strength (RSS), received SNR (Signal to Noise Ratio), and received SINR (Signal to Interference plus Noise Ratio).

AoA Estimation and Joint Optimization of Multiple BS Beams

Figure 1B:
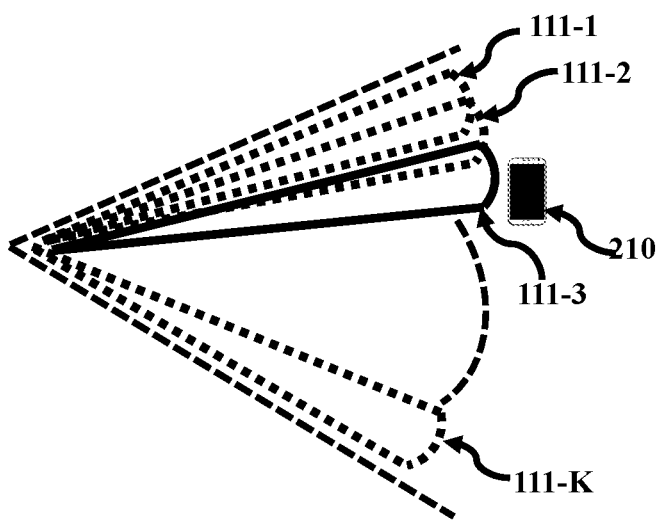
FIG. 1B is a graphical depiction of an example of multiple BS fixed beams in a sector, according to some embodiments.
Figure 1C:
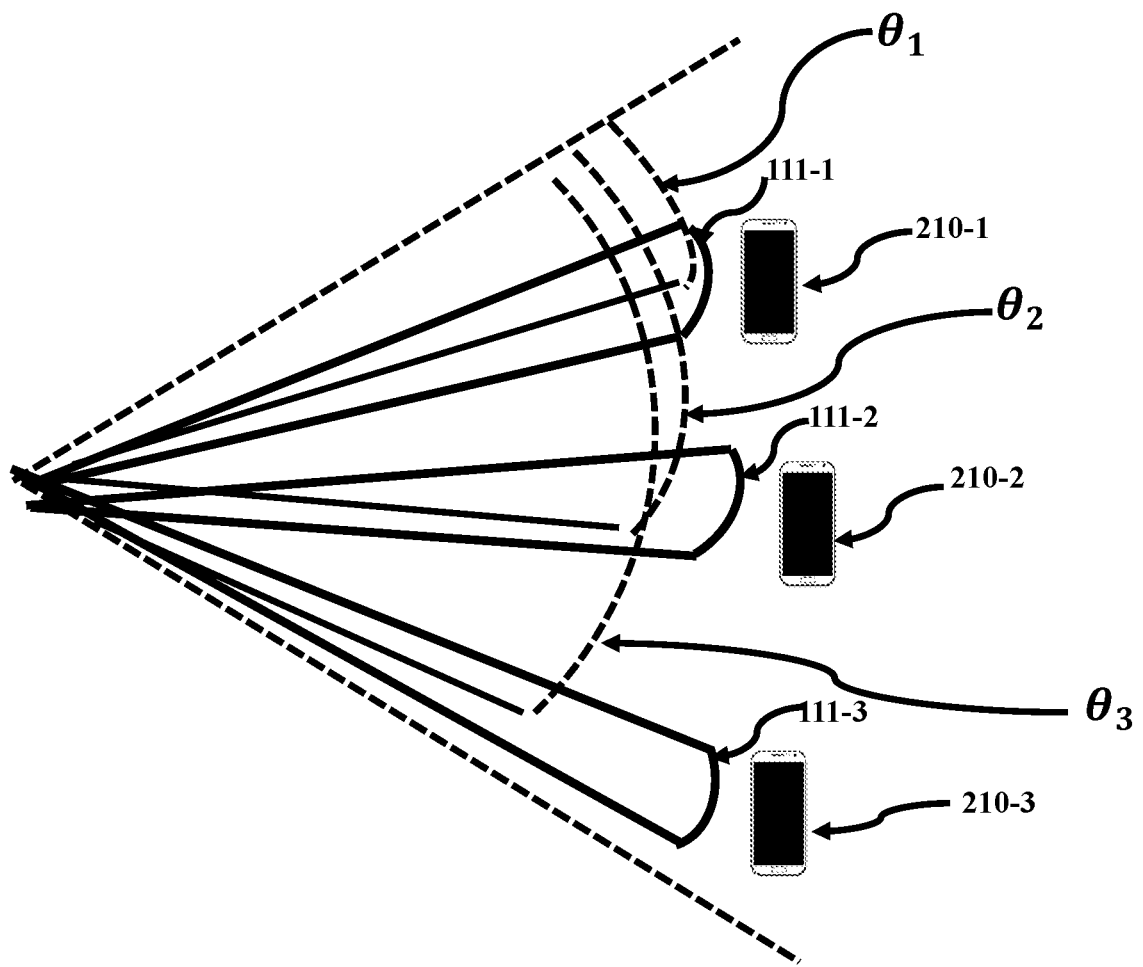
FIG. 1C is a graphical depiction of an example of multiple BS steerable beams in a sector, according to some embodiments.

In one approach to forming multiple beams within a sector, the sector is divided into N sub-sectors, the BS antenna aperture is capable of forming at least N beams whose boresights are fixed toward a set of specific angular positions, each beam covers one sub-sector as illustrated by FIG. 1A, where N fixed beams 111-1 to 111-N cover the azimuthal angular range of one sector. The beam which provides the highest gain toward UE 210, beam 111-2 in FIG. 1A, shown by the solid triangular shape, is used to communicate with UE 210. However, peak gain (boresight) of beam 111-2 is not placed on UE 210, resulting in reduced received signal strength at the UE versus a system that steers the boresight of the beam toward the UE. In another beamforming approach that uses fixed beams, the BS oversamples the number of fixed beams, generating K overlapping beams as shown in FIG. 1B. A subset of the overlapping beams is used for concurrent communications with NKK UEs. In the example of FIG. 1B, beam 111-3 whose boresight is more closely pointing toward UE 210, compared to that of beam 111-2 in FIG. 1A, is used to communicate with UE 210, thereby achieving higher received signal strength at UE 210. In a steerable multibeam beamforming approach, the boresight of a BS beam is steered toward each UE that is communicating with the BS, thereby maximizing the received signal strength at the UE. FIG. 1C illustrates a case of 3 steered beams 111-1, 111-2 and 111-3, whose boresights are at the azimuthal angles $\theta_1$, $\theta_2$, and $\theta_3$ relative to the upper edge of the sector, and are each pointed toward a different UE, thereby maximizing the received signal strength at each UE. Therefore, one aspect of beamforming optimization is to steer the boresight of the BS beam toward the UE with which the BS is communicating, thereby maximizing the received signal strength at the UE.

The main lobe of adjacent co-frequency beams, operating on the same frequency channel, may create significant cross-beam interference, even when the adjacent beams are spaced by as much as a half power BW or more. The graphically simplified triangular beams 111-j, shown in FIGS. 1A, 1B and 1C, do not exhibit the sidelobes of the beams. The beams' sidelobes cause cross-beam interference even among non-adjacent co-frequency beams. Therefore, a second aspect of beamforming optimization is to jointly shape multiple beams to minimize the cross-beam interference among multiple co-frequency beams, thereby enhancing the SINR received at the UEs and the BSs and increasing spectrum efficiency. In this disclosure, systems and methods are described for the implementation of beamforming algorithms that place the boresight of a BS/UE beam toward the desired UE/BS while placing nulls, or large attenuations, toward the other UEs/BSs such as to minimize interference to the other UEs/B Ss. Henceforth, the beamforming embodiments are described for the BSs. A person of ordinary skill in the art will recognize that the systems and methods described in this disclosure for beamforming by BSs also apply to beamforming by UEs, without departing from the scope of the disclosure.

One exemplary BS antenna aperture is comprised of M columns and L rows of antenna elements. The BS is capable of forming multiple beams and steering the beams in azimuth and elevation by determining the beamformer phases and gains for each beam, and applying the phases 230 and gains to each of the antenna elements in the rows and columns of antenna elements. In one approach to beam steering in azimuth and elevation, a factorable 2-dimensional array whose response is the product of responses in the azimuth and elevation axes is used. If the beamformer coefficients, $w_{lk}$, where l is the index of the elements in a column of elements and k is the index of the elements in a row of elements, are written as $w_{lk} = \gamma_l e^{j\Theta_l} \beta_k e^{j\Theta_k}$, where $\{\gamma_l e^{j\Theta_l}\}_{l=1}^{L}$ are the elevation beamformer coefficients that shape the beam in elevation, and $\{\beta_k e^{j\Theta_k}\}_{k=1}^{M}$ are the azimuth beamformer coefficients that shape the beam in azimuth. Then, the array response may be written as $$H(\omega_x, \omega_y) = \sum_{l=1}^{L} \sum_{k=1}^{M} w_{lk} e^{-j(l\omega_y + k\omega_x)} = \sum_{l=1}^{L} \gamma_l e^{j\Theta_l} e^{-jl\omega_y} \sum_{k=1}^{K} \beta_k e^{j\Theta_k} e^{-jk\omega_x} = H(\omega_x)H(\omega_y). \quad (1)$$

Equation (1) shows that for the factorable 2-dimensional array, the beamformer may, separately, compute and apply the beamformer coefficients for steering the beam in the azimuth and elevation dimensions.

Figure 2A:
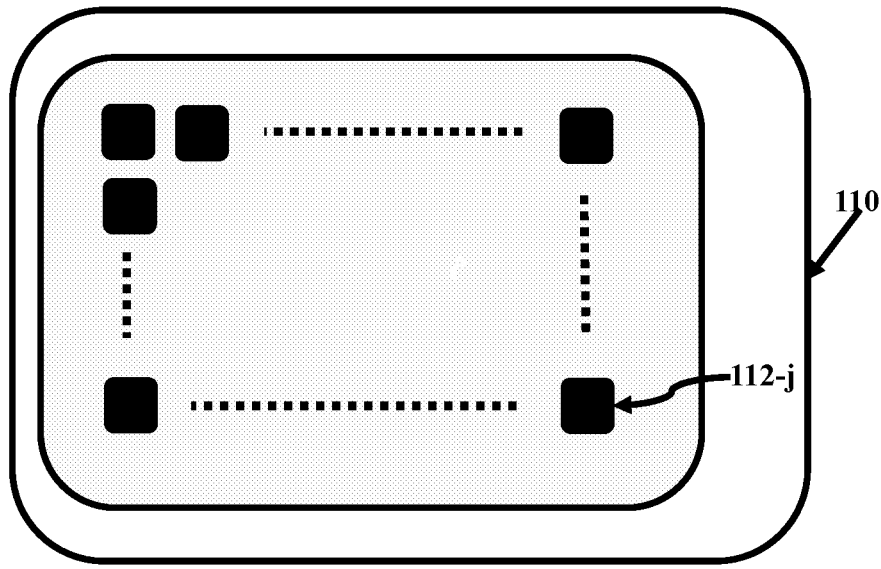
FIG. 2A is a graphical depiction of an exemplary antenna aperture structure, according to some embodiments.
Figure 2B:
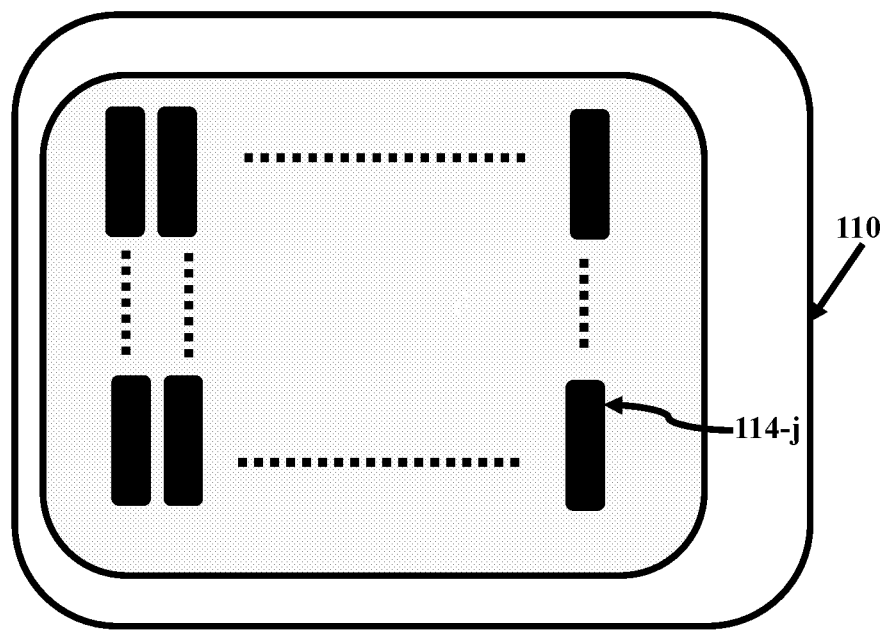
FIG. 2B is a graphical depiction of an exemplary antenna aperture structure, according to some embodiments.

The BSs/UEs may generate beams using digital beamforming, analog beamforming or a hybrid of analog and digital beamforming. FIG. 2A illustrates an exemplary antenna aperture 110 that comprises of rows and columns of antenna elements 112-j. In one embodiment, antenna elements 112-j are spaced at half wavelength. In one embodiment, digital beamforming implementation is used for the application of the azimuth and elevation beamformer coefficients for the antenna aperture of FIG. 2A. In another embodiment, digital beamforming is used to apply the azimuth beamformer coefficients, and analog beamforming is used to apply the elevation beamformer coefficients for the antenna aperture of FIG. 2A. FIG. 2B illustrates an exemplary antenna aperture comprised of antenna elements 114-j that are longer in the y-direction (elevation) and are shorter in the x-direction (azimuth). In one embodiment, digital beamforming is used to implement the azimuth and elevation beamformer coefficients of the exemplary antenna aperture of FIG. 2B. In a variation of the embodiment, antenna elements 114-j are spaced at half wavelength in each row.

Figure 2C:
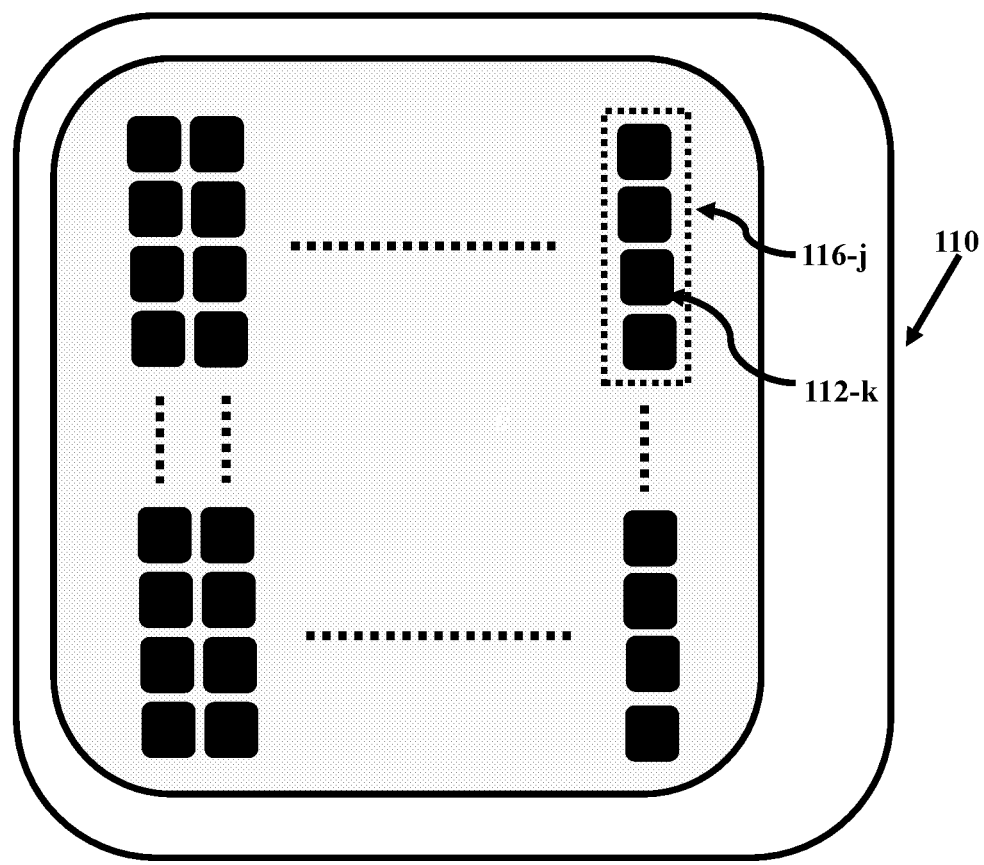
FIG. 2C is a graphical depiction of an exemplary antenna aperture structure, according to some embodiments.

FIG. 2C illustrates an antenna aperture wherein a number of antenna elements of the type 112-k are grouped in the y-direction to form antenna sub-apertures 116-j. In one embodiment for beamformer coefficient implementation for the exemplary antenna aperture of FIG. 2C, digital beamforming is used to implement the azimuth beamformer coefficients for the antenna sub-apertures 116-$j$, hybrid beamforming is used in the elevation direction wherein the elevation beamformer coefficients are further divided into a product of a first and a second set of elevation beamformer coefficients, the first set of elevation beamformer coefficients are applied to the elements 112-$k$ within an antenna sub-aperture 116-$j$ using analog beamforming, the second set of elevation beamformer coefficients are applied to the antenna sub-apertures 116-$j$ using digital beamforming. In a variation of the embodiment, the analog beamformer coefficients applied to the elements 112-$k$ within an antenna sub-aperture 116-$j$ are chosen to tilt the beam of each antenna sub-aperture toward a first elevation angle, and the elevation beamformer coefficients applied digitally to the antenna sub-apertures 116-$j$ steer the beam in elevation within a range of elevation angles around the said first elevation angle. The aforementioned elevation hybrid beamforming embodiment reduces the number of required D/A and A/D convertors versus a fully digital beamforming scheme; thereby reducing power consumption, while using analog beamforming to focus the angular range of the digital elevation beam steering to the desired range for each BS sector.

Figure 3:
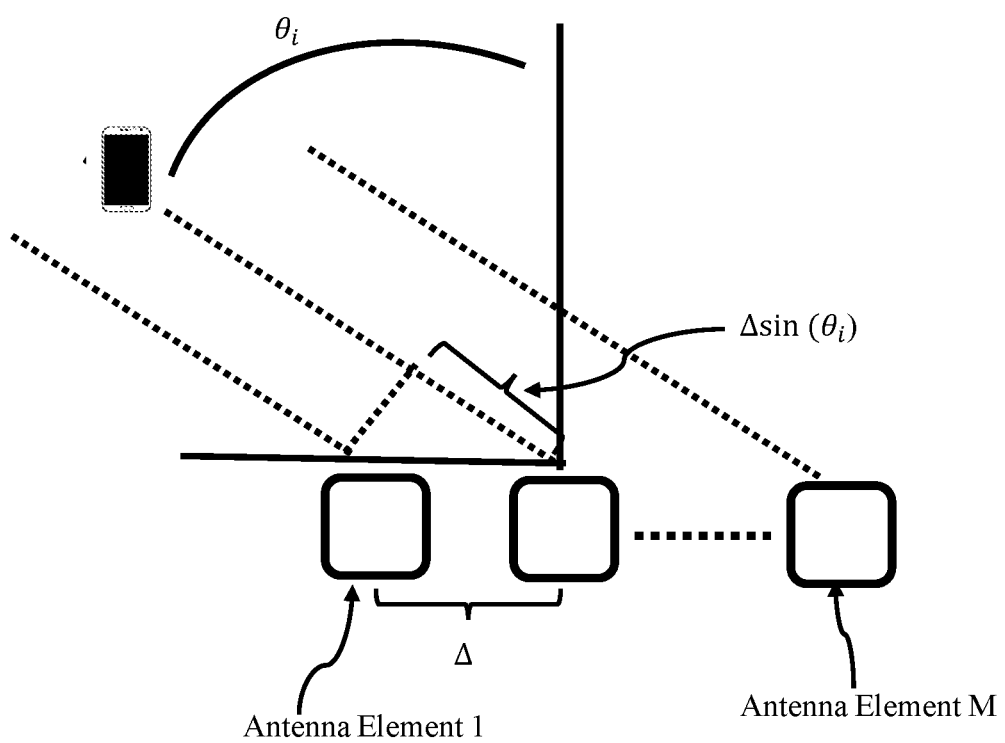
FIG. 3 is an exemplary graphical depiction of beamformer geometry, according to some embodiments.

Henceforth, systems and methods are described for the implementation of the azimuth beamformer coefficients. A person with ordinary skill in the art will recognize that the same systems and methods are also applicable for implementing the elevation beamformer coefficients, without departing from the scope of the disclosure. Consider azimuth beam shaping and steering using one row of M antenna elements. FIG. 3 shows a beamformer geometry for an antenna aperture with M antenna elements in azimuth spaced at half a wavelength, the angle of arrival of the signal received from a UE, and the difference between the distance that the signal travels to arrive at two adjacent antenna elements. One exemplary algorithm that reduces cross-beam interference is described next. Let $\underline{w}_k$ denote an M by 1 vector of the azimuth beamformer coefficients for the k-th UE, N be the number of simultaneous beams, $\underline{H}$ denote the M by N channel impulse response matrix, and $\underline{r}_k = [r_k(\theta_1) \, r_k(\theta_2) \ldots r_k(\theta_N)]^T$ be a desired spatial filter response for the k-th UE, where $r_k(\theta_k)$ is the desired spatial filter's response for the k-th user whose signal is being received at the BS at the angle $\theta_k$.

In one embodiment, $r_k(\theta_k)$ is set to 1 for the angle toward the k-th UE and to 0 for $r_k(\theta_i)$, $i \neq k$, toward the other N−1 UEs, to eliminate interference to those UEs. One exemplary Least Square (LS) algorithm for optimizing the received SINR at the UEs, also referred to as Zero-Forcing (ZF) algorithm in the literature, computes the spatial filter weights $\underline{w}_k$ for the k-th UE to minimize $$|\underline{H}^H \underline{w}_k - \underline{r}_k|^2, \quad (2)$$

The solution to (2) is given by $$\underline{w}_k = \underline{H}(\underline{H}^H \underline{H})^{-1} \underline{r}_k, \quad (3)$$

assuming the inverse exists, where the underlined lowercase bold letters indicate vectors, and the underlined capital bold letters indicate matrices. There are other variations of the above exemplary ZF algorithm. A person with ordinary skill in the art will recognize that the systems and methods described in this disclosure for the implementation of beam shaping algorithms are also applicable to the variations of the above exemplary ZF algorithm, without departing from the scope of the disclosure.

In general, for a system with wide frequency band, fast time varying channel and a large number of antenna elements M estimating the channel impulse response matrix $\underline{H}$ may require high overhead. On the other hand, as M increases, the beam's beamwidth (BW) decreases, resulting in a smaller multipath delay spread and a channel impulse response that changes slowly across the frequency band, requiring a smaller number of channel impulse response samples for interpolation to estimate the full channel impulse response. As an example, consider a system where the BS antenna aperture has a row of M=32 and L=32 antenna elements. At 30 GHz, an antenna aperture with 32 by 32 elements, spaced at half wavelength, has a size of about 16 cm by 16 cm, which is feasible to deploy. The BW of the 32 by 32 element antenna aperture beam is about 3 degrees. Also, consider a UE antenna comprising of a row of four antenna elements spaced at half wavelength, whose BW is about 45 degrees. Then, for the aforementioned BS and UE antenna BWs and for LOS conditions, multipath is limited to a small area around the receiving antenna which may result in a flat frequency response. Even in NLOS conditions where delay spread may be larger relative to LOS, the channel impulse response is expected, due to the small BS antenna beam BW, to change slowly across the frequency band.

The array response vector is defined as $$\underline{\alpha}(\theta_i) = [1 \, e^{jw_s(\theta_i)} \ldots e^{j(M-1)w_s(\theta_i)}]^T \quad (4)$$

where $w_s(\theta_i) = 2\pi\Delta \sin(\theta_i)/\lambda$, $\Delta$ is antenna element spacing, and $\lambda$ denotes wavelength. If $\Delta = \lambda/2$, then $w_s(\theta_i) = \pi \sin(\theta_i)$. The array response matrix is defined as $\underline{A} = [\alpha(\theta_1) \, \alpha(\theta_2) \ldots \alpha(\theta_N)]$. In LOS conditions, where channel frequency response is flat, the channel impulse response matrix reduces to $$\underline{H}^{LOS} = [h_1 \alpha(\theta_1) h_2 \alpha(\theta_2) \ldots h_N \alpha(\theta_N)], \quad (5)$$

where $h_i$ is the complex scalar flat frequency response from the BS antenna aperture to the i-th UE. In NLOS conditions with small delay spread, the channel impulse response matrix may be written as $$\underline{H}^{NLOS} = [h_1(w)\alpha(\theta_1) h_2(w)\alpha(\theta_2) \ldots h_N(w)\alpha(\theta_N)], \quad (6)$$

where $h_i(w)$ is the multipath channel impulse response from the BS antenna aperture to the i-th UE.

In one embodiment for the estimation of the DL frequency channel impulse response component $h_i(w)$, the BS forms a DownLink (DL) beam toward the UE using an estimate of the AoA at the BS of the signals received from the UE, the BS transmits a DownLink Reference Signal (DLRS) on a subset of the frequencies separated across the frequency band, the UE detects the DLRS signals on the said subset of the frequencies, the UE estimates a partial channel impulse response for the said subset of the frequencies and interpolates the said partial channel impulse response to estimate the full DL frequency channel impulse response $h_i(w)$.

The channel impulse response matrices in (5) and (6) require that all beamformer hardware transmit paths be calibrated, and all hardware related phases and gains of the different beamformer transmit paths be compensated prior to applying the beamformer coefficients computed based on the said channel impulse response matrices. Let $c_i$ be the hardware related complex scalar response of the i-th transmit path from digital samples to upconversion, to power amplification and to transmission through the antenna element. In one embodiment, the i-th row of $\underline{H}$, the channel impulse response for the DL frequency, is multiplied by $1/c_i$ to remove any hardware related phases/gains, prior to applying the spatial filter coefficients for the DL (transmit) beams as computed based on (3) to (6) and variations thereof.

Let $d_i$ be the hardware related phases/gains of the i-th receive path from antenna element to radio front end, to downconversion and to baseband. In one embodiment, the i-th row of $\underline{H}$, the channel impulse response for the UL frequency, is multiplied by $1/d_i$ to remove any receive path hardware related phases/gains prior to applying the spatial filter coefficients for UL (receive) beams as computed based on (3) or (6) and variations thereof. In one embodiment for the estimation of the UL frequency channel impulse response component $h_i(w)$, the UE forms a UE beam on which the UE receives the highest signal quality from the BS and transmits an UpLink Reference Signal (ULRS) on a subset of the frequencies separated across the frequency band, the BS estimates a partial channel impulse response for the said subset of the frequencies and interpolates the said partial channel impulse response to estimate the full UL frequency channel impulse response $h_i(w)$.

Figure 4:
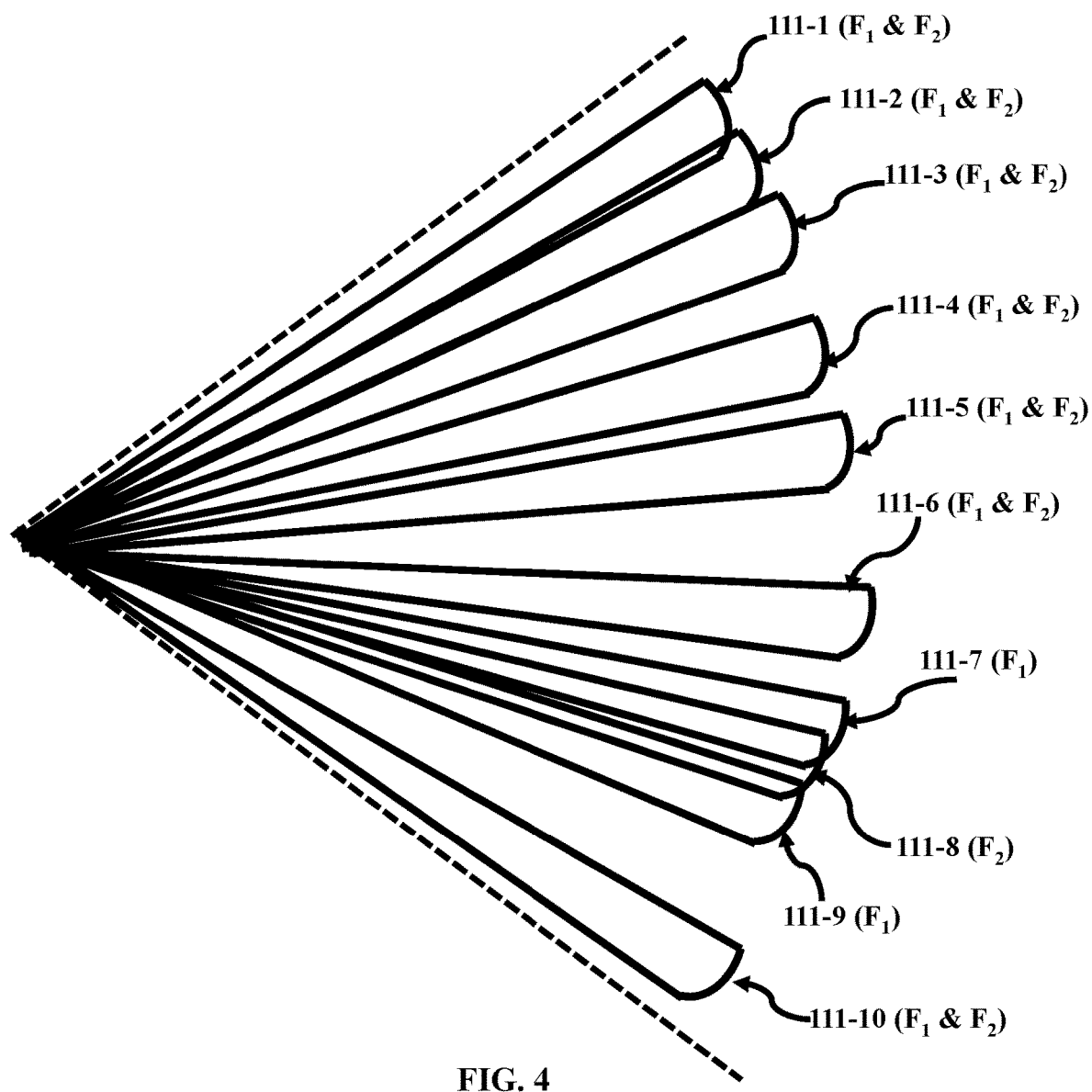
FIG. 4 is a graphical depiction of an example of frequency reuse for downlink data beams, according to some embodiments.

In some embodiments, the available frequency band, F, is divided into a set of frequency channels $F_1, \ldots F_N$. For a given frequency reuse pattern, each frequency channel, $F_i$, is assigned to a subset of the BS beams. In one frequency reuse pattern, all frequency channels, $F_i$, are assigned to all beams, referred to as the frequency reuse of 1, where in effect all the available frequency band is simultaneously used on each beam. FIG. 4, illustrates a scenario where the BS forms 10 beams, the available frequency band is divided into two frequency channels, both frequency channels $F_1$ and $F_2$ are assigned to beams 111-1 to 111-6 and to beam 111-10. Beams 111-7 to 111-9, which are highly overlapped, are only assigned one frequency channel, wherein the adjacent beams do not use the same frequency channel in order to reduce cross-beam interference among the overlapping beams. The optimal frequency reuse pattern, for a given set of beams, is the one that achieves maximum total throughput defined as the sum of the data rates over all beams. The total throughput of a frequency reuse pattern, for a set of beams, depends on the joint beamforming algorithm. In one embodiment, the beam shaping and frequency reuse pattern determination for a set of beams are carried out jointly, wherein: the BS specifies a set of frequency reuse patterns, uses a joint multibeam beamforming algorithm to optimize the SINR on each set of the co-frequency beams for each of the frequency reuse patterns, computes the total throughput for each frequency reuse pattern by summing the data rates over all beams for the said frequency reuse pattern, and chooses the frequency reuse pattern with the highest total throughput. In a variation of the embodiment, for systems that use dual polarization antenna apertures, each frequency channel $F_i$ is used twice, as channels $F_{i,1}$ and $F_{i,2}$, where $F_{i,1}$ is channel $F_i$ used on a first antenna polarization, and $F_{i,2}$ is channel $F_i$ used on a second antenna polarization, and all frequency channels $F_{i,1}$ and $F_{i,2}$ are used in specifying a frequency reuse pattern.

In order to implement the aforementioned beamforming schemes, Angle of Arrival (AoA) of the signal received at a BS from a UE, angle $\theta_i$ in FIG. 3, is needed. The AoA of a signal received at a BS from a UE is, in this disclosure, referred to as the UE-to-BS-AoA. The BSs form three main types of dedicated beams for each UE, the UL search beams, the DL dedicated control beams, and DL/UL dedicated data beams. The UL search beams are used to search the uplink signals to estimate the UE-to-BS-AoA. The DL dedicated control beams are used to send dedicated control information to the UE. The DL and UL dedicated data beams are used to send and receive data and control information to/from the UE. In one embodiment, the DL dedicated control beams and the DL/UL dedicated data beams that are formed by a BS, and pointed toward a set of UEs within a sector, are jointly shaped using the estimated UE-to-BS-AoAs for the said UEs and a joint beamforming optimization algorithm described by equations (3) through (6) or variations thereof.

A class of UEs, such as devices for broadband to homes, may have antenna aperture dimensions comparable to those of BSs, thereby forming beams with narrow BWs. Furthermore, a reference direction may also be defined for the fixed UEs, as is done for the BSs. Then, a fixed UE may estimate the AoA of the signals received from a BS, use the AoA to point the boresight of the UE beam toward the BS with which the UE is communicating, while placing nulls at a number of other BSs to minimize interference to/from the BSs. In one embodiment, the UE is configured with the position location coordinates of the BSs, the UE is also configured with its own position location coordinates, or estimates its own position location coordinates using a geo-location technology, and estimates the AoA of the signals received from the BSs using the position location coordinates of the BSs and the UE.

In one embodiment for estimating the UE-to-BS-AoA, the BS uses digital beamforming, the UE transmits an UpLink Access Probe (ULAP) signal, the ULAP carries a reference signal to enable the BS to measure the ULAP signal quality, and the BS carries out a search, for ULAPs, in frequency, time and space by forming and sweeping a UL search beam within the BS sector angular range until a ULAP signal is detected. The initial UL search beam boresight angular pointing position where the ULAP is detected is defined as the nominal angular position. In a variation of the embodiment, the BS forms a set of overlapping beams that cover the sector angular range, searches each of the overlapping beams, and chooses the beam from which the highest signal quality is received as the nominal angular position. In one embodiment, the BS iterates the nominal angular position to enhance the estimate of the UE-to-BS-AoA according to: the BS specifies two candidate angular positions separated from the nominal angular position by $\pm \Delta_\theta(n)$ degrees, n being the iteration index, estimates the ULAP received signal quality at each of the two candidate angular positions, and if the ULAP received signal quality from a candidate angular position is higher than that of the nominal angular position then the BS sets the nominal angular position to that of the candidate angular position with the highest signal quality, until a specified convergence criterion is satisfied at which time the BS sets the UE-to-BS-AoA to that of the latest nominal angular position. In a variation of the embodiment, the parameter $\Delta_\theta(n)$ is adaptively made smaller during the different iterations in order to increase the accuracy of the UE-to-BS-AoA estimate while achieving fast convergence.

In another embodiment for determining the UE-to-BS-AoA, a two-stage spatial search of the ULAP signals, comprising of a coarse spatial search stage followed by a fine spatial search stage, is carried out. During the coarse spatial search, the BS divides its sector angular coverage range into a number of sub-sectors, sequentially forms a UL search beam covering each subsector and searches for ULAPs using each sub-sector beam. If a ULAP is detected on a sub-sector beam, the spatial search enters fine mode search, where the BS specifies an angular range around the boresight angular position of the UL search beam on which the ULAP is detected at the end of the coarse search, divides the said angular range into a number of smaller fine angular sub-ranges, sequentially forms UL search beams whose boresights point to the center of each angular sub-range, estimates the ULAP received signal quality on each of the said UL search beams, chooses the UL search beam with the highest ULAP received signal quality, and uses the boresight angular position of the UL search beam as the UE-to-BS-AoA of the signals received at the BS from the UE. In a variation of the embodiment, the fine spatial search stage further comprises of multiple stages, where the fine angular sub-range of each subsequent fine spatial search are smaller than that of the previous fine search.

In one embodiment, once the BS detects a ULAP and determines the UE-to-BS-AoA, the BS forms a DL dedicated control beam toward the UE and transmits a ULAP-ACK, acknowledging the reception of the ULAP. In one embodiment, the ULAP comprises of a reference signal that is spread with a specific modulation symbol pattern, to distinguish the ULAP from other signals, effectively carrying one bit of information, which informs a BS that a UE is attempting initial access. In this disclosure, the modulation symbol pattern that is used to spread a reference signal is also referred to as a pseudo-noise sequence. In one embodiment, the ULAP signal length is chosen to be long enough so that the receiver of the closest BS accumulates enough energy, after dispreading, to detect the ULAP. In one embodiment, the ULAP-ACK also comprises of a reference signal, spread using a specific pseudo-noise spreading sequence, effectively carrying one bit of information. The ULAP and ULAP-ACK reference signals are also, in this disclosure, referred to as preamble. In a variation of the embodiment, the ULAP-ACK is transmitted on specific physical layer resources, such as a specific set of tones/symbols in an OFDM based system, for which UE searches after sending a ULAP. In another embodiment, the ULAP and ULAP-ACK are comprised of a preamble followed by a payload carrying information such as the UE/BS identification.

Fast Uplink-Initiated Initial Access

In conventional cellular systems (e.g., 3G and 4G systems), a BS broadcasts a DownLink Shared Reference Signal (DLSRS) and a DownLink Shared Control Channel (DLSCCH) on a sector-wide beam. During the initial network access, a UE searches for the DLSRS transmitted by the BSs, estimates the received signal quality of each detected DLSRS, chooses the BS from which the UE receives the DLSRS with the highest signal quality with which to communicate, and decodes the DLSCCH of the BS to obtain system parameters. A sector-wide broadcast DLSRS/DLSCCH approach may also be used in MU-MMIO systems. However, antenna apertures of MU-MIMO systems that are designed to provide a large number of beams are capable of forming high gain narrow beams, to extend the sector range and/or data rate. If a sector-wide beam is used to transmit the DLSRS/DLSCCH, then a UE, which may have a low gain antenna beam, will need to receive the DLSRS for a long time duration, and receive the DLSCCH at a low data rate, in order to achieve adequate processing gain to successfully detect the DLSRS and decode the DLSCCH messages. Long DLSRS signals, and low data rate DLSCCH messages, will increase the system overhead, thereby reducing network throughput. In some systems that use beamforming with M antenna elements, where each antenna element has a dedicated power amplifier, the transmit EIRP (Effective Isotropic Radiated Power) may be reduced by a factor of $M^2$ when only one antenna element is used to broadcast the DLSRS/DLSCCH within a sector, which results in a significant link budget loss, thereby requiring to increase the length of the DLSRS/DLSCCH and their associated overheard.

As an alternative to a sector-wide beam, narrow beams may be used to transmit DLSRS/DLSCCH. In one embodiment, a sector may be covered by a fixed number of beams, equally spaced as shown in FIG. 1A, and the DLSRS/DLSCCH may be transmitted on one beam at a time. Beam 111-2 in FIG. 1A is transmitting DLSRS/DLSCCH, while dotted beams are not transmitting, wherein the entire BS sector EIRP is dedicated to the single transmitting beam, allowing shorter DLSRS and higher data rate DLSCCH. In this approach, the DLSRS/DLSCCH are transmitted multiple times, once per fixed beam, which also tends to increase the DL overhead. In another embodiment, DLSRSs/DLSCCHs are concurrently transmitted on all narrow beams in a sector. In this approach, the DLSRS/DLSCCH of all narrow beams are transmitted simultaneously, but the available BS EIRP is shared among all beams, resulting in a longer DLSRS and lower data rate DLSCCH, versus the one narrow beam at a time approach. Furthermore, in the aforementioned DLSRS/DLSCCH transmission approaches, the DLSRSs/DLSCCHs need to be transmitted frequently such as to maintain the initial system access delay by the UEs below a certain threshold. The frequent transmission of DLSRS/DLSCCH will further increase the overhead, thereby reducing network throughput. Henceforth, in this section, an uplink-initiated initial access is described that achieves fast initial access while significantly reducing signaling overhead.

The current UE-to-BS-AOA is defined as the latest estimated AoA of signals received at a BS from a UE. In one embodiment for uplink-initiated initial access, the UEs begin initial access by transmitting a ULAP in an asynchronous manner without first acquiring DL synchronization prior to the ULAP transmission. In one embodiment, the ULAP may be sent on an uplink Asynchronous RACH (ARACH) channel whose resources, in terms of frequency allocation, are a priori known to the UEs, such as having been downloaded to the UEs as configuration parameters. In one embodiment, the UEs use an initial UE configuration phase procedure, wherein the BSs periodically transmit a DLSRS and a DL Shared Configuration Message (DLSCM) on a fixed set of narrow beams covering each sector of a BS, the UEs search for the DLSRS during the initial UE configuration phase, detect the DLSRS and decode the DLSCM to extract system parameter information such as ARACH frequency resources. Since the initial UE configuration needs to be rarely executed by the UEs, perhaps only once when a user procures and activates the device, then the DLSRS/DLSCM may be periodically transmitted on a set of fixed beams covering a sector with a small periodicity, perhaps as low as once a minute resulting in negligible overhead. In another embodiment, a second network, such as a legacy LTE network, may be used to send the configuration parameters to the UEs.

In one embodiment, the ULAP-ACK includes a message that carries system parameter information such as frequency and time slot resource allocation of the RACH of the BS which is transmitting the ULAP-ACK, as well as those of the BSs within a certain range from the BS. Then, the UE after receiving one ULAP-ACK on one UE beam, has synchronized to the DL, will have information on the RACH resources and timing, and may transmit the ULAPs on the other UE beams on the RACH, thereby reducing load on the ARACH. An access probe that a UE transmits on the RACH is referred to as the UpLink RACH Probe (ULRP), and the ULRP-ACK is the acknowledgment to the ULRP. The ULRP has the same functionality as that of the ULAP but is transmitted on the RACH instead of the ARACH. In another embodiment, the UE is capable of communicating with a first and a second network, the second network is used to send information, to the UEs, on the RACH resources of the first network. An example of the second network is an LTE network. In a variation of the embodiment, the first and second networks are synchronized, the UE synchronizes to the second network, receives information regarding the RACH resources from the second network, and transmits a ULRP, instead of a ULAP, on the UE beams. Henceforth, the uplink-initiated initial access embodiments are described using the ULAP as the access probe. A person with ordinary skill in the art will recognize that the systems and methods described for the ULAP-based initial access embodiments also apply when the ULRP is used instead of the ULAP, without departing from the scope of the ULAP based embodiments.

Figure 5:
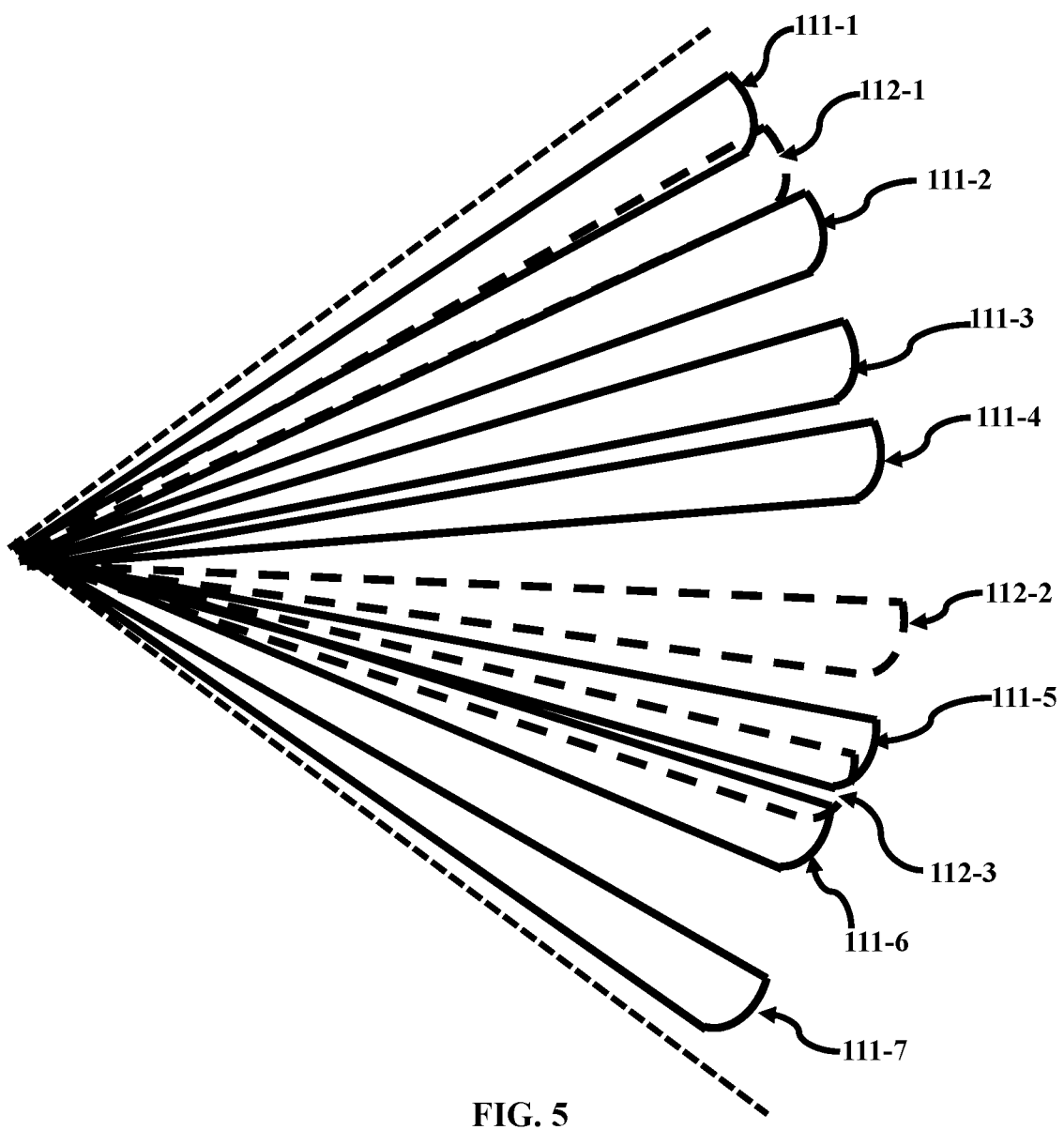
FIG. 5 is a graphical depiction of an example of downlink dedicated control channel beams and dedicated data beams, according to some embodiments.

In one uplink-initiated initial access procedure, a UE initiates initial access by sequentially transmitting a ULAP on each of the UE's beams. As was described in embodiments of a previous section, the BSs continuously carry out a frequency, temporal and spatial search of the ULAP messages by sweeping narrow UL search beams within their sector coverage area. If a BS detects a ULAP, the BS designates the UL search beam angular pointing position on which the ULAP is received with the highest signal quality as the AoA of the ULAP received at the BS from the UE, sets the current UE-to-BS-AOA to the AoA, forms a DL dedicated control beam using the current UE-to-BS-AOAs of all the active UEs and a multibeam beamforming algorithm, and transmits a ULAP-ACK to the UE on the DL dedicated control beam. In other words, in the uplink-initiated initial access, the DL control signaling to the UEs is sent on DL dedicated control beams, thereby avoiding the use of DLSCCH in order to minimize DL overhead. FIG. 5 illustrates a BS that has formed seven DL dedicated data beams 111-1 to 111-7 shown by the solid lines, and three DL dedicated control beams 112-1 to 112-3 shown by the dashed lines. In one embodiment, the DL dedicated data beams and the DL dedicated control beams are all steered to their respective UEs and are formed using a joint beamforming scheme to maximize the received SINR on each beam as described in the previous embodiments.

Figure 6A:
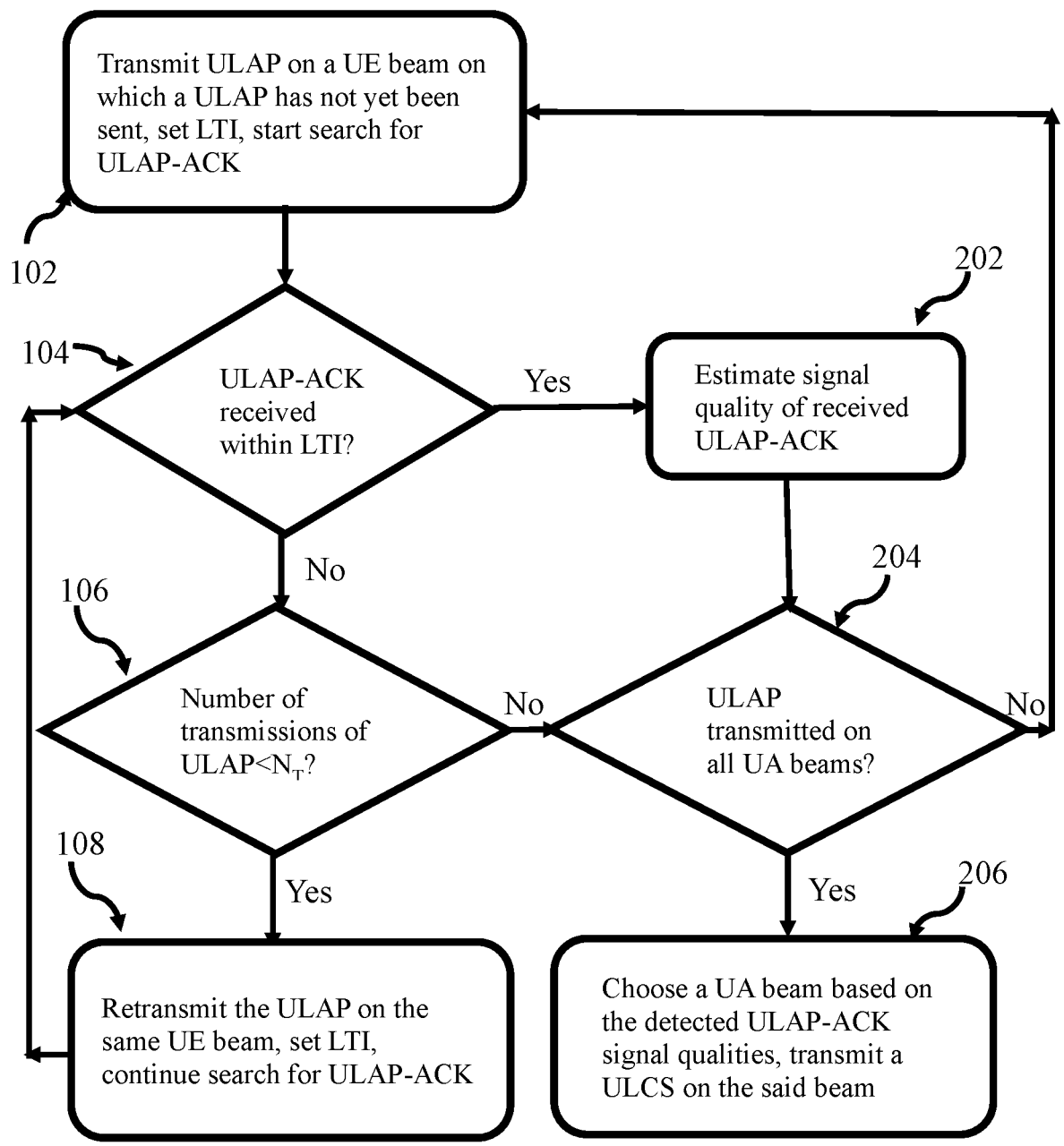
FIG. 6A is a flow chart of an exemplary uplink-initiated initial access procedure, according to some embodiments.

FIG. 6A provides an exemplary flow chart of the UE steps for an uplink-initiated initial access procedure, according to one embodiment. The Listen Time Interval (LTI) is defined as the time interval that the UE waits to receive an acknowledgement from a B S, for a ULAP that the UE has transmitted, before retransmitting the ULAP. In step 102, the UE transmits a ULAP on a UE beam on which a ULAP has not yet been transmitted, sets the LTI timer and begins the search for ULAP-ACK messages on the same UE beam. In step 104, if a ULRP-ACK has been received within the LTI, then the UE in step 202 estimates the signal quality of the received ULAP-ACK and goes to step 204. If in step 104 a ULAP-ACK has not been received with the LTI, then the UE moves to step 106. In step 106, if the number of transmissions of the ULAP on the same UE beam is less than a number $N_T$, the UE retransmits the ULAP in step 108 and goes back to step 104, otherwise the UE moves to step 204. In step 204, if ULAPs have not transmitted on all UE beams, then the UE goes back to step 102 to transmit a ULAP on another UE beam, otherwise the UE moves to step 206, chooses a UE beam based on the signal qualities of the detected the ULAP-ACKs, and transmits an UpLink Connection Setup (ULCS) message on the said UE beam initiating a connection setup procedure. In one variation of the embodiment, the UE chooses the UE beam on which a ULAP-ACK with the highest signal quality is received. In another variation of the embodiment, the UE increases the power transmitted on the ULAP for each retransmission of the same ULAP. In another variation of the embodiment, the ULCS comprises of a preamble and a payload that carries information such as the UE's identification. The LTI must be chosen to be larger than the sum of the transmission time of the ULAP, the round-trip delay from the UE to the farthest BS that may detect the ULAP transmitted by the UE, the ULAP signal processing time at the BS, the BS scheduling delay for the ULAP-ACK, and the transmission and propagation time of the ULAP-ACK.

A BS that receives a ULCS from a UE, transmits a ULCS-ACK to the UE on the DL dedicated control beam formed toward the UE using the current UE-to-BS-AOA, acknowledging the ULCS. The ULCS-ACK comprises of a preamble and a payload that carries information such as the BS's identification. In one embodiment, the ULAP-ACKs transmitted by all BSs comprise of only a preamble and use the same spreading code which are not BS specific. If a UE receives multiple ULAP-ACKs on one UE beam and transmits a ULCS message on the same beam, then multiple BSs may receive the ULCS message and multiple BSs may respond with ULCS-ACK messages. In one embodiment, in order to resolve the ambiguity that may result when multiple BSs send a ULCS-ACK to a UE, the UE extracts the BS's identification information from each ULCS-ACK, determines the BS from which it receives the ULCS-ACK with the highest signal quality, and transmits a UL Confirmation Message (ULCM) carrying the UE identification, thereby completing the connection with only one BS. In another embodiment, the ULAP-ACK transmitted by each BS is spread using a BS specific pseudo-noise sequence, and the UE includes in the ULCS the identity of the ULAP-ACK pseudo-noise sequence with the highest received signal quality. In another embodiment, the ULAP-ACK comprises of a preamble and a payload carrying the BS's identification, and the UE includes in the ULCS the identification of the BS from which a ULAP-ACK with the highest signal quality has been received. In a variation of the embodiments, the BS whose identity is included in the ULCS transmits the ULCS-ACK.

In another embodiment, the ULAP-ACKs carry the identification of the BSs; the UE includes in the ULCS the identity of the BSs from which a ULAP-ACK has been received as well as the signal qualities of the received ULAP-ACKs; the UE transmits the ULCS on one of the UE beams on which a ULAP-ACK is received; a BS that receives the ULCS forwards the ULCS to a Central Controller (CC); the CC chooses a BS from among the BSs listed in the ULCS with which to establish the connection with the UE, and sends a request to the BS to set up the connection; and the BS sends a ULCS-ACK message to the UE establishing connection. The CC functionality may be supported by the processor subsystem of one of the BSs, or by a dedicated processor.

If multiple BSs receive the same ULAP and transmit their ULAP-ACKs within the same time slot using the same frequency resources, then the multiple ULAP-ACKS will collide. In one embodiment for avoiding ULAP-ACK collision, different ULAP-ACK time slot scheduling delays are assigned to a set of BSs to stagger, in time, the ULAP-ACKs transmitted by the BSs. In another embodiment for avoiding collision, different frequency resources are assigned to a set of BSs for the transmission of the ULAP-ACKs.

Figure 6B:
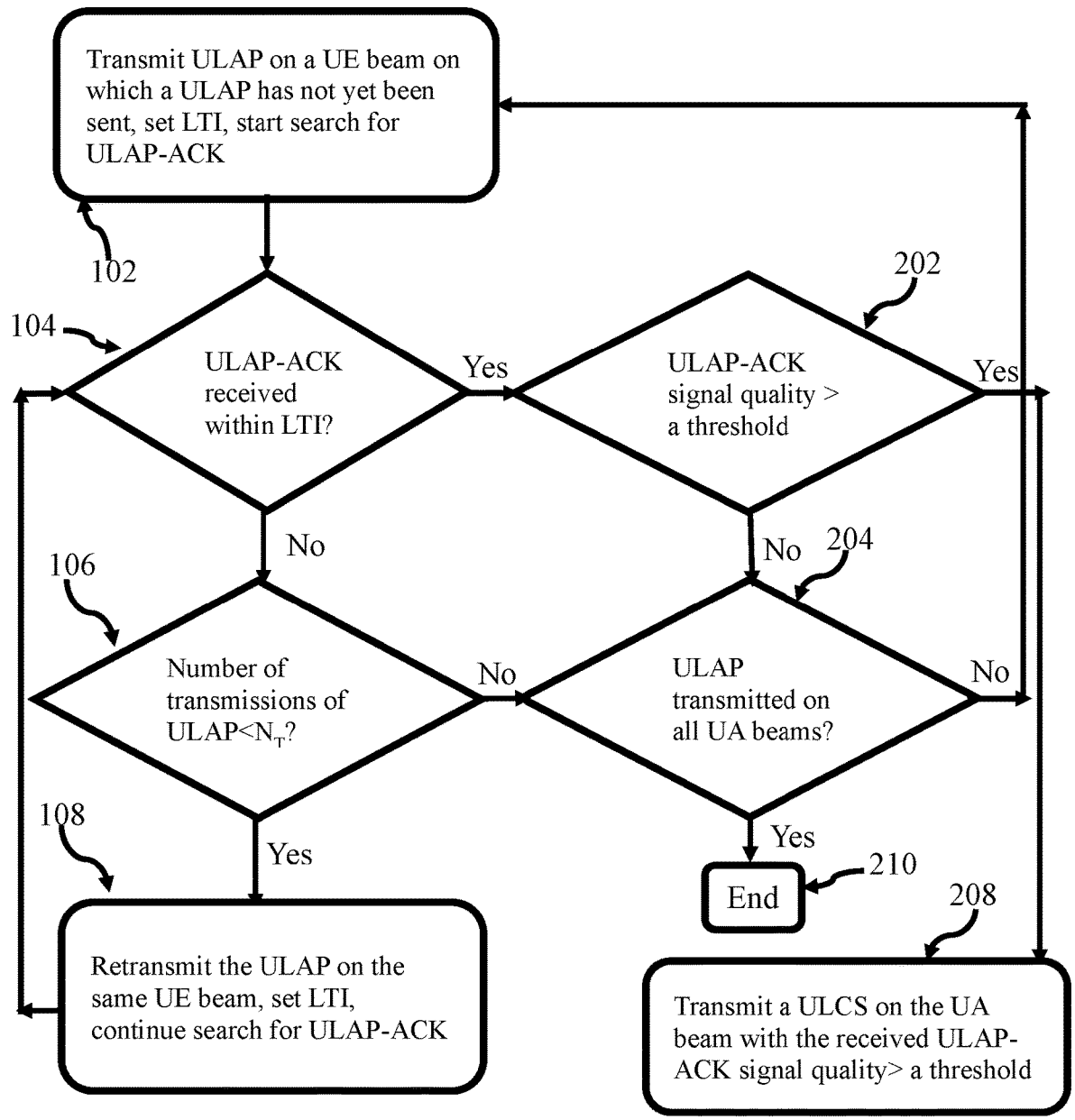
FIG. 6B is a flow chart of an exemplary uplink-initiated initial access procedure, according to some embodiments.

FIG. 6B provides an exemplary flow chart of the UE steps for an uplink-initiated initial access procedure, according to one embodiment. In step 102, the UE transmits a ULAP on a UE beam on which a ULAP has not yet been transmitted, sets the LTI timer and begins the search for ULAP-ACK messages on the same UE beam. In step 104, if a ULRP-ACK has been received within the LTI, then the UE moves to step 202. In step 202, the UE estimates the signal quality of the received ULAP-ACK, and if the signal quality is above a threshold then the UE goes to step 208 to transmit a ULCS on the same UE beam, otherwise the process goes to step 204. If step 104 indicates that a ULAP-ACK has not been received within the LTI, the process moves to step 106. In step 106, if the number of transmissions of the ULAP on the same UE beam is less than a number $N_T$, then the UE, in step 108, retransmits the ULAP and goes to step 104, otherwise the process moves to step 204. In step 204, if ULAPs have not been transmitted on all UE beams, then the UE goes back to step 102 to transmit a ULAP on another UE beam, otherwise the UE goes to step 210 where the process ends. In a variation of the embodiment, the UE increases the power transmitted on the ULAP for each retransmission of the same ULAP.

In one embodiment, a UE forms a handover-candidate-set as a set of BSs from which a ULCS-ACK with a signal quality above a threshold is received. A handover-BS is the BS to which a UE is handed over when the UE initiates a handover procedure. As will be described later, when a handover procedure is initiated, a UE or a CC (Central Controller) may use the UE's handover-candidate-set as the set of BSs which the UE or the CC may evaluate to determine the handover-BS.

Figure 7A:
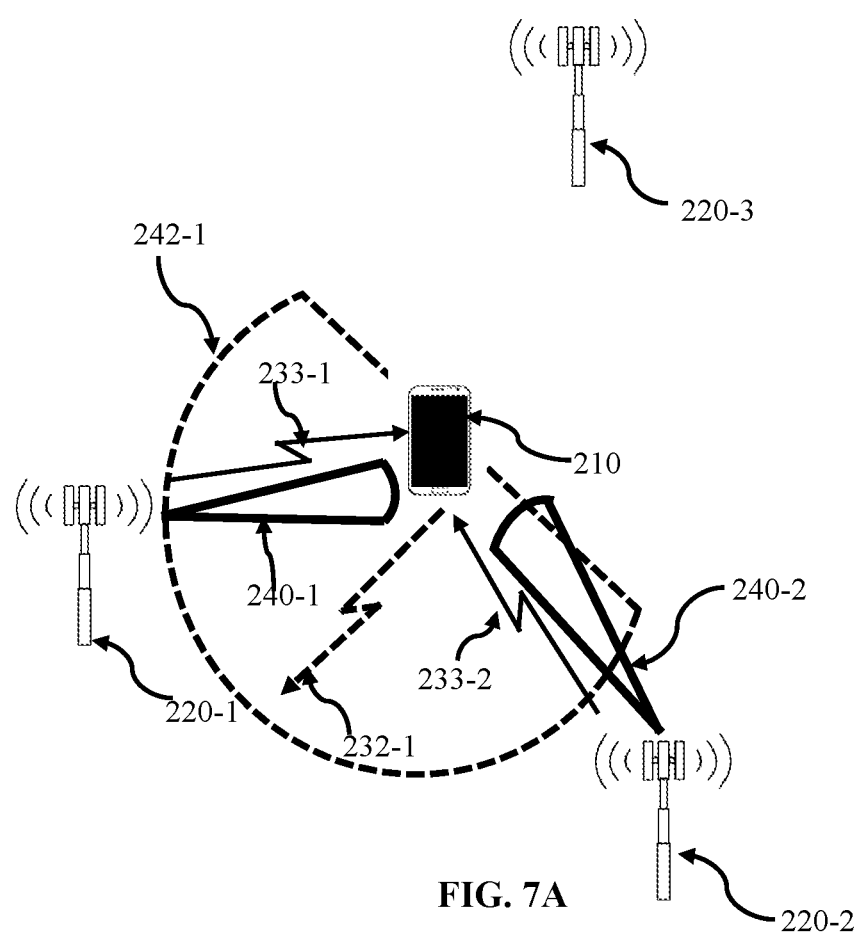
FIGS. 7A and 7B are graphical depictions of an example of an uplink-initiated initial access signaling, according to some embodiments.
Figure 7B:
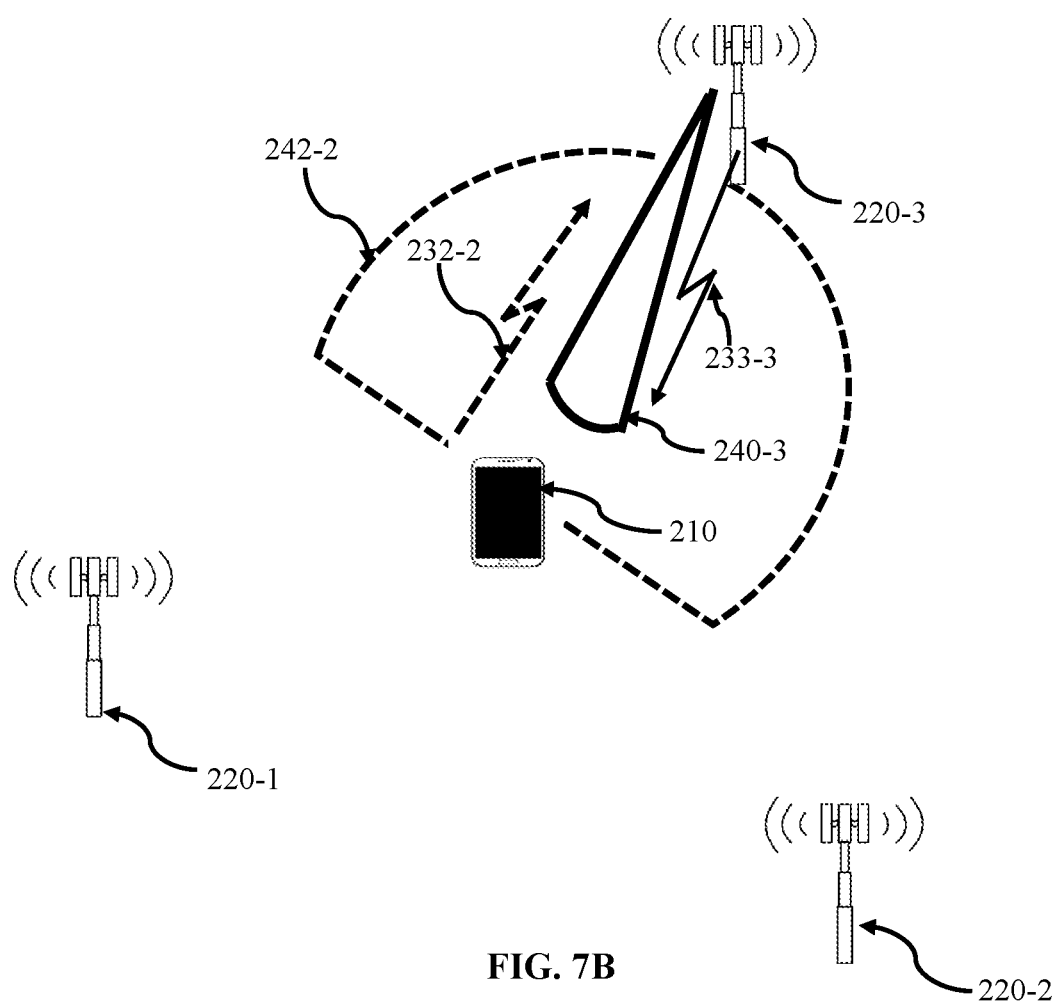
Figure 7C:
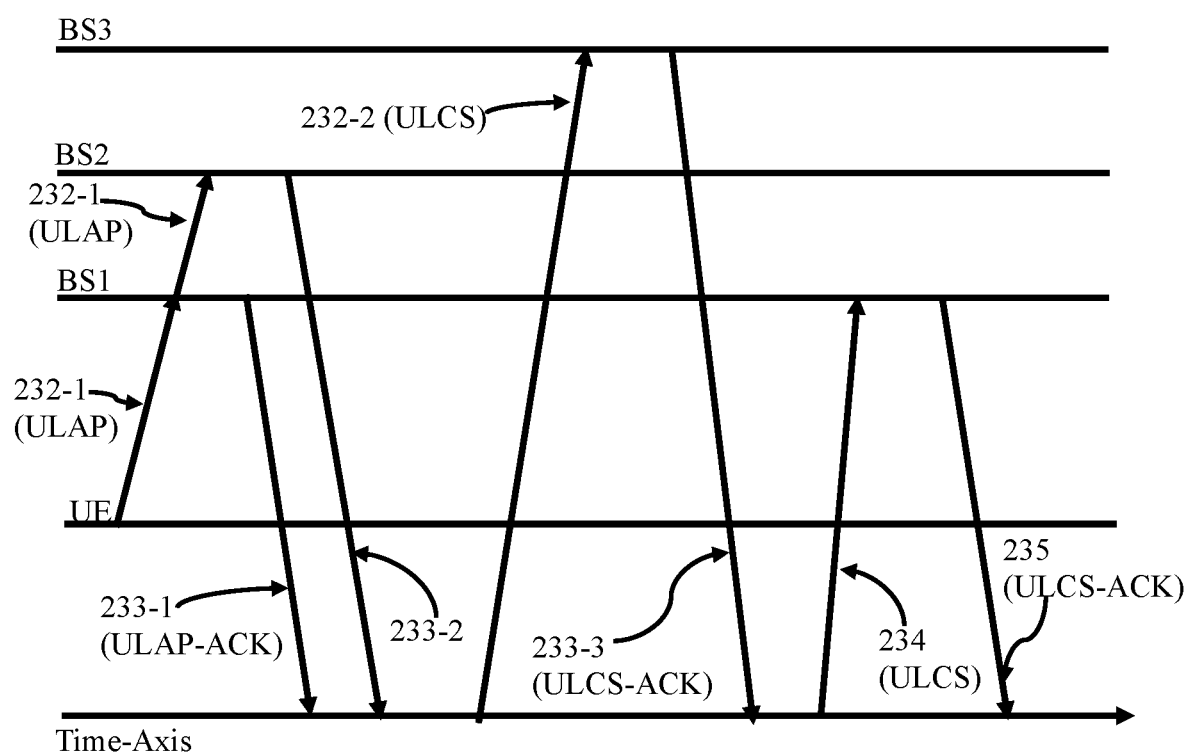
FIG. 7C is an exemplary uplink-initiated initial access message flow, according to some embodiments.

FIGS. 7A, 7B and 7C illustrate an example of an uplink-initiated initial access as described above, where the UE is capable of forming one of two beams at a time. As illustrated in FIG. 7A, UE 210 initially forms beam 242-1, shown by the dashed semicircle, and transmits ULAP message 232-1, shown by the dashed zig-zag line, on beam 242-1. BSs 220-1 and 220-2 determine the UE-to-BS-AOAs using the UL search beam angular position on which they receive ULAP 232-1 with the highest signal quality. The BSs then transmit ULAP-ACK messages 233-1 and 233-2, shown by the solid zig-zag lines, to UE 210 on beams 240-1 and 240-2 formed using the UE-to-BS-AOAs. Upon receiving the ULAP-ACKs on beam 242-1, the UE transmits a ULAP on its second beam 242-2, as shown in FIG. 7B. Once ULAP-ACK 233-3 has been received for ULAP 232-2, the UE chooses the ULAP-ACK with the highest received signal quality, and sends a ULCS on the same UE beam from which the said ULAP-ACK was received, initiating connection setup. The BS, after receiving the ULCS from the UE, transmits a ULCS-ACK to the UE on a DL dedicated control beam that is formed using the current UE-to-BS-AOA. In one embodiment, the BS transmits the ULCS-ACK on the same DL dedicated control beam on which the ULAP-ACK was transmitted. In a variation of the embodiment, the BS also informs the CC of the established connection between the BS and the UE.

FIG. 7C illustrates an exemplary timeline and sequence of messages exchanged between the UE and the three BSs in the example of FIGS. 7A and 7B. In FIG. 7C, the time from the beginning of each arrow to the tip of the arrow is the transmission plus propagation time for each message. The time between the reception of a message and the start of transmission of a response 615 by the BS accounts for signal processing and DL scheduling delay at the BS. Therefore, the total initial access delay for a UE with multiple beams and a BS employing digital beamforming may be approximated by summing all the ULAP transmission/propagation times, the signal processing/transmission/propagation times and DL scheduling of the ULCS-ACKs, all the timed out LTIs, the ULCS transmission/propagation times, and the signal processing/transmission/propagation times and DL scheduling of the ULCS-ACKs. The propagation delay is of order of micro-seconds for sectors with radius of a few kms. In systems with data rates of tens of Mbps or higher, the transmission times of the ULAP and the ULAP-ACK messages may be of order of tens to hundreds of micro-seconds because these messages carry a small amount of information, as small as only a single bit of information. Then, the ULAP-ACK DL scheduling and transmission/propagation times, which determine the LTI value, are dominated by the DL scheduling delay, which in some systems may be of the order of milli-seconds. Similarly, in some systems, the DL scheduling and transmission/propagation times of the ULCS and the ULCS-ACK messages, which are also small messages and carry UE identification and link establishment parameters, may be of the order milli-seconds. Accounting for all the delay components, the initial access completion time is, in some systems, of the order of milli-seconds. Therefore, the UE-to-BS-AOA, estimated by a BS using a received ULAP from the UE, will not change during the uplink-initiated initial access procedure described above, and the said UE-to-BS-AOA may be used to transmit/receive to/from the UE until the initial access is completed.

In one embodiment, the UE is configured with the position location coordinates of all the BSs and also estimates its own position location using a geo-location technology, the UE uses the position location information to compute the free space path loss from each BS to the UE, and generates a neighbor-set of the BSs whose free space path loss to the UE is below a threshold. In another embodiment, the network coverage area is divided into a number of geographic bins, a BS makes a path loss estimate between the BS and a UE in each bin by using the received signal strengths at the BS from the signals transmitted by the UE, and sends the path loss estimates to a CC; in one variation of the embodiment, the BS makes the path loss estimate by dividing the received signal strengths at the BS by the UE's EIRP. For each bin, the CC forms a neighbor-set data base, for each UE in a bin, by listing the BSs whose path loss estimates to the UE are below a threshold, and includes in the data base the path loss estimates from the said BSs to the UE. In another embodiment, the UE computes a nominal path loss based on a function of the path loss estimates from the UE to the BSs. Examples of the nominal path loss are the path loss from the UE to the nearest BS, or the average of the path losses from the UE to all the BSs in the neighbor-set. In another embodiment, the UE sets the ULAP nominal transmit power to a value so that the product of the UE's EIRP and the UE to the BS nominal path loss be above a threshold.

In some embodiments, the UE estimates its own position location using a geo-location technology such as a satellite based geo-location system or a terrestrial based network of access points. In one embodiment for initial access organized by a CC, the UE sequentially transmits a ULAP on the UE beams until the UE receives a ULAP-ACK. Once the UE receives a ULAP-ACK, then the UE transmits a message with its position location coordinates on the same UE beam on which the ULAP-ACK was received. The BS that receives the message with the UE's position location coordinates informs the CC of the UE's position location coordinates; the CC informs the BSs in the neighbor-set of the UE's position location coordinates and requests that the BSs transmit a ULAP-ACK to the UE. Each BS in the neighbor-set computes the UE-to-BS-AoA using the position locations of the UE and the BS, forms a DL dedicated control beam toward the UE and transmits a ULAP-ACK on the said beam. The UE, following the transmission of the message with its position location coordinates, starts searching for the ULAP-ACKs being transmitted by the BSs in the neighbor-set.

Figure 6C:
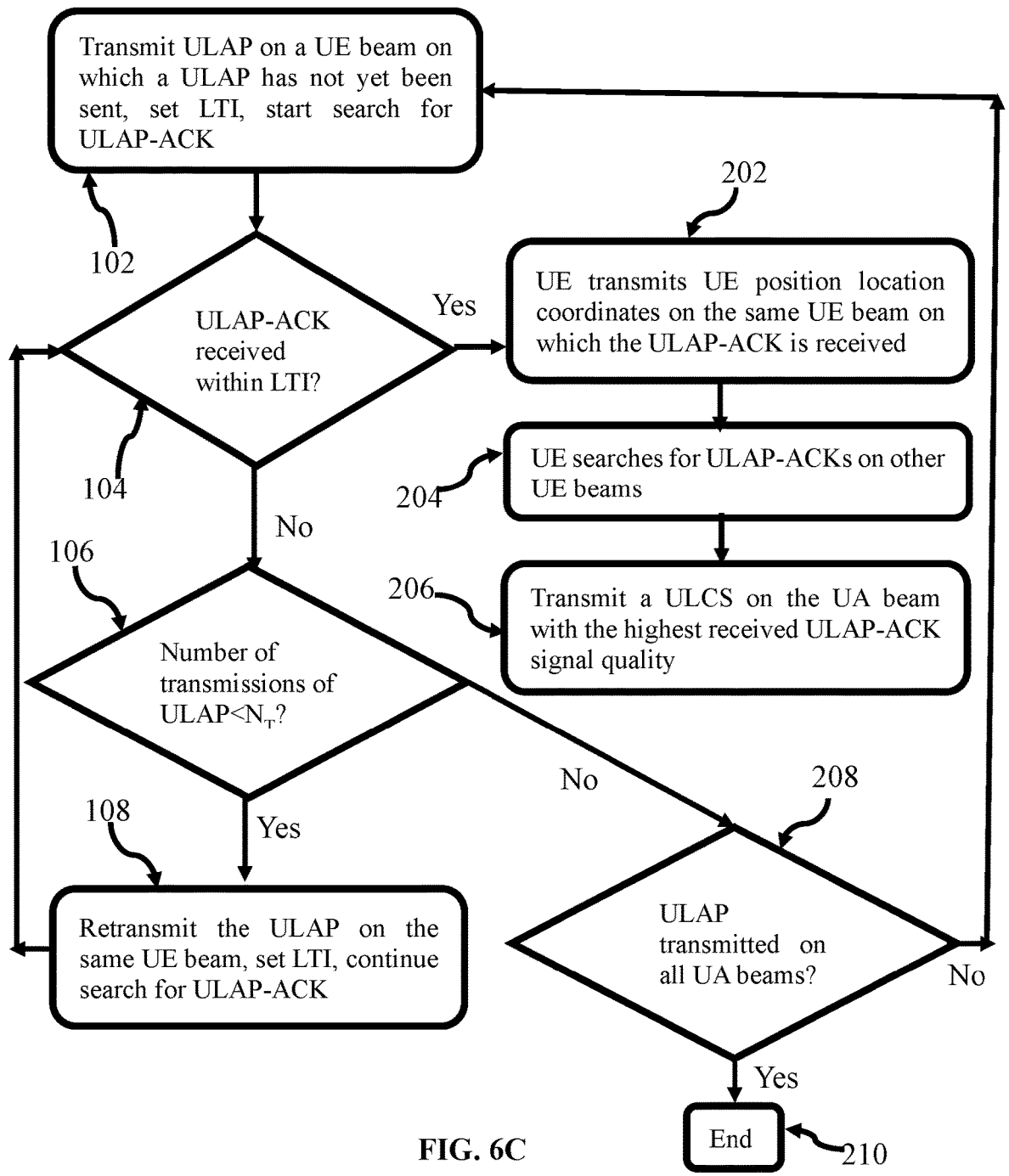
FIG. 6C is a flow chart of an exemplary uplink-initiated initial access procedure, according to some embodiments.

The UE steps for the embodiment for initial access organized by the CC are illustrated in FIG. 6C. In step 102, the UE transmits a ULAP on a UE beam on which a ULAP has not yet been transmitted, sets the LTI timer and begins the search for ULAP-ACK messages on the same UE beam. In step 104, if a ULAP-ACK has been received within the LTI, then in step 202 the UE transmits its position location coordinates on the same UE beam on which the UALP-ACK was received, and moves to step 204. In step 204, the UE starts searching, on the other UE beams, for the ULAP-ACKs that the BSs in the neighbor-set are transmitting. In step 206, the UE transmits a ULCS on the UE beam on which the ULAP-ACK with the highest signal quality is received. If step 104 indicates that a ULAP-ACK has not been received within the LTI, the UE moves to step 106. In step 106, if the number of transmissions of the ULAP on the same UE beam is less than a number $N_T$, then the UE moves to step 108. In step 108, the UE retransmits the ULAP, sets the LTI times and starts the search for ULAP-ACKs. In step 106, if the number of transmissions of the ULAP on the same UE beam is not than a number $N_T$, the process moves to step 208. In step 208, if ULAPs have not been transmitted on all UE beams, then the UE goes back to step 102 to transmit a ULAP on another UE beam, otherwise the UE goes to step 210 where the process ends. In a variation of the embodiment, once a BS receives the ULCS from the UE, the BS informs the CC that the UE has completed the DL ULAP-ACK signal quality measurements on all the UE beams, and the CC informs the BSs in the UE's neighbor-set that they discontinue transmitting the ULAP-ACK to the UE.

The BS with which a UE is currently communicating is referred to as the serving-BS. A BS-serving-beam is referred to as the BS DL data/control beam boresight angular pointing position, with respect to a reference direction, toward a UE with which the BS is communicating. The reference direction of a BS may be chosen to be the line perpendicular to the center of an antenna aperture as shown in FIG. 3, or any other fixed reference direction. A UE-serving-beam is defined as a UE beam boresight angular pointing position toward a BS with which the UE is communicating.

In another embodiment for initial access, a UE periodically sends it position location coordinates to the serving-BS, the serving-BS uses the BS's and UE's position location coordinates to update the UE-to-BS-AoA and the BS-serving-beam, the serving-BS forms a DL dedicated data beam using the updated BS-serving-beam, the serving-BS transmits a DLDRS on the updated BS-serving-beam, and the UE detects the DLDRS and carries out a spatial search of the received DLDRS to update the UE-serving-beam. The accuracy of the position location-based beam tracking scheme depends on the accuracy of the UE's and BS's position location estimates, the BW of the BS-serving-beam, and the periodicity with which the UE sends its position location updates to the serving-BS. As the serving-BS-beam's BW narrows, higher position location accuracy is required to ensure that the B S-serving-beam accurately points to the UE. The UE position location reporting periodicity needs to be higher than the time during which the user's mobility may move the UE outside of the serving-BS-beam's BW. The accuracy of the ULAP based beam tracking depends on the signal quality of the received ULAP after dispreading and the accuracy of the UL searcher, both of which may be made very accurate by choosing the length of the ULAP accordingly and using a high-resolution UL searcher. The overhead of the position location-based beam tracking is higher than that of the ULAP approach because a ULAP carries as small as only one bit of information, whereas position location reporting requires sending more information.

In one embodiment, the UE is equipped with an antenna subsystem capable of forming at least one beam and a radio subsystem that is capable of transmitting only on one UE beam at a time, the UE radio subsystem transmits a ULAP on one UE beam at a time and waits for a ULAP-ACK before transmitting a ULAP on another beam. In another embodiment, the UE is equipped with an antenna subsystem that is capable of concurrently forming multiple beams, and is also equipped with a radio subsystem that is capable of concurrently transmitting on multiple beams and receiving on multiple beams, the UE concurrently transmits ULAPs on multiple beams, searches for ULAP-ACKs on the multiple beams, determines the signal quality of the received ULAP-ACKs, chooses the ULAP-ACK with the highest signal quality and transmits a ULCS message on the UE beam on which the said ULAP-ACK was received. In a variation of the embodiment, the UE stops transmitting ULAPs when a ULAP-ACK with a signal quality above a threshold is received, and sends a ULCS on the UE beam on which the ULAP-ACK is received.

Figure 6D:
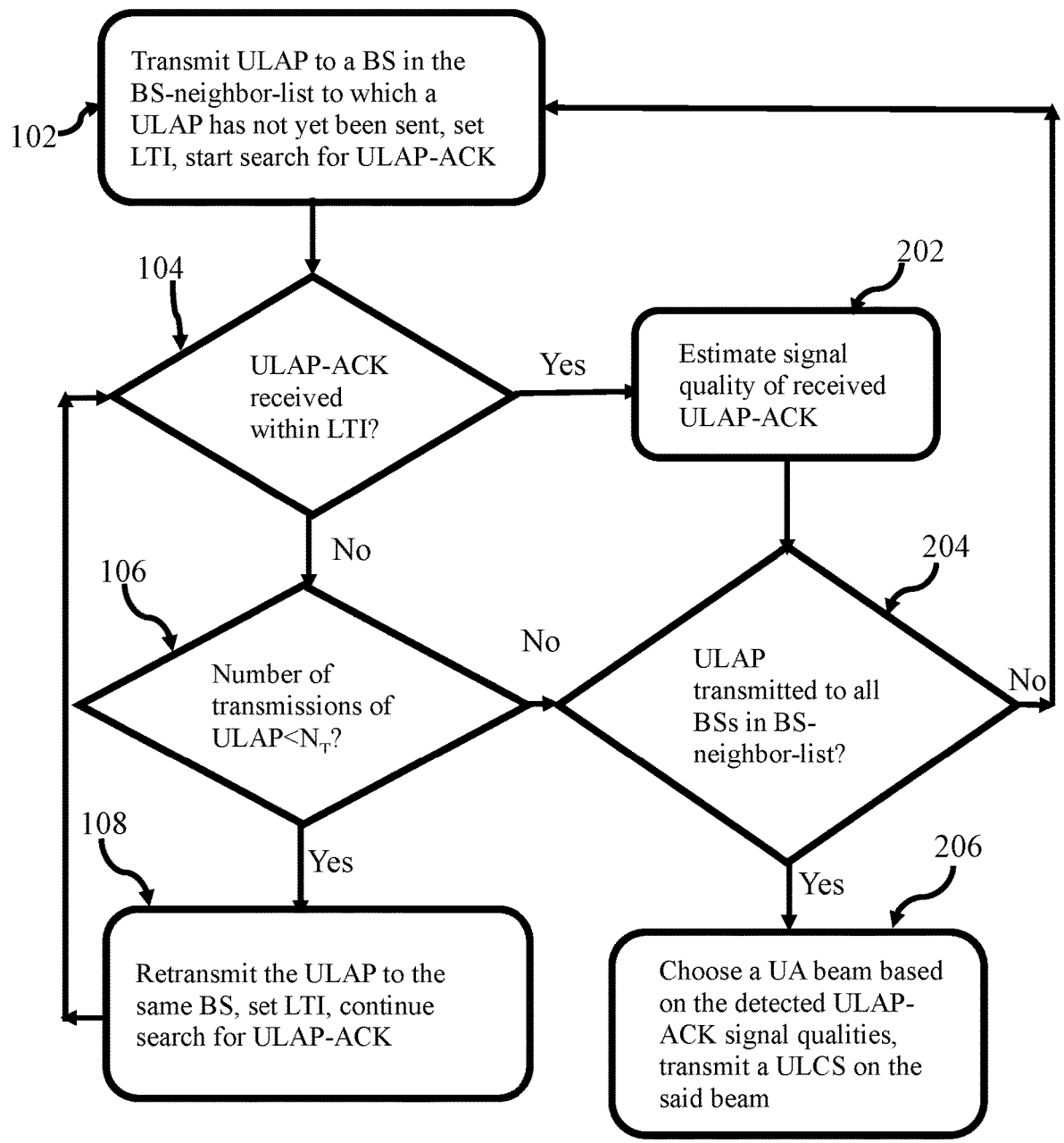
FIG. 6D is a flow chart of an exemplary uplink-initiated initial access procedure, according to some embodiments.

For fixed UE devices, the UE's antenna beam boresight angular pointing position may be specified relative to a reference direction, such as a line perpendicular to the center of one the UE's antenna apertures. In one embodiment, a UE estimates its own position location coordinates, uses the position location coordinates of a BS in the neighbor-set and that of the UE to compute the BS-to-UE-AoA from the BS to the UE, uses the said BS-to-UE-AoA to determine an UE antenna aperture and a beam which have the highest gain toward the BS, and uses the UE antenna aperture and the beam on which to transmit a ULAP to the BS. FIG. 6D is an exemplary flow chart of the UE steps for an initial access procedure, according to one embodiment. In step 102, the UE transmits a ULAP to a BS in the neighbor-set to which a ULAP has not yet been transmitted, sets the LTI timer and begins the search for ULAP-ACK messages on the same UE beam. If, in step 104, a ULAP-ACK has been received within the LTI, then the UE in step 202 estimates the signal quality of the received ULAP-ACK and moves to step 204. If, in step 104, a ULAP-ACK has not been received within the LTI, then the UE goes to step 106. In step 106, if the number of transmissions of the ULAP to the same BS is less than a number $N_T$, then the UE, in step 108, retransmits the ULAP and goes to step 104, otherwise the UE moves to step 204. In step 204, if ULAPs have not been transmitted to all the BSs in the neighbor-set, then the UE goes back to step 102 to transmit a ULAP to another BS, otherwise the UE goes to step 206, chooses the BS from which the ULAP-ACK with the highest signal quality is received, and transmits a ULCS to the said BS initiating a connection setup procedure.

In another embodiment, the initial access for fixed UE devices comprises of repeating the steps of: the UE transmitting a ULAP signal to one BS at a time in the UE's neighbor-set, the UE retransmitting the ULAP until a ULAP-ACK is received or the number of transmissions of the ULAP reaches a number $N_T$, the UE estimating the signal quality of all the received ULAP-ACK messages until a ULAP-ACK with a signal quality above a threshold is received or a ULAP has been sent to all the BSs in the UE's neighbor-set, and the UE sending a ULCS message to the BS from which the ULAP-ACK with the received signal quality above a threshold is received.

The ULAPs are expected to generate a small load on the ARACH because they carry a small amount of information, as small as one bit according to some embodiments, and are also sent only during the initial access. In one embodiment, a small amount of dedicated frequency resources, commensurate with the expected ULAP load, are assigned to the ARACH, wherein the ARACH frequency resources are not assigned to any other UL channel or UE. In another embodiment, the ULAP may be transmitted as an underlay signal by spreading the ULAP over a specified frequency resources, where another UE or UL channel may be scheduled to concurrently transmit data on the same frequency resources. For instance, in an OFDM based system, a UE may transmit a ULAP over a specified subset of the OFDM tones. The BS despreads the ULAP to accumulate energy to detect the information carried by the ULAP. The number of tones and OFDM symbols over which the ULAP is spread is chosen so that, even when another UE is transmitting data on the same OFDM tones, the ULAP be detectable with a certain probability of detection, and the ULAP be transmitted at a low power to reduce interference to any data being transmitted by another UE on the same OFDM tones.

During normal operation, there is a low probability of collision of the ULAPs transmitted by multiple UEs because the number of UEs trying to concurrently carry out initial access is small. Furthermore, since the BSs form narrow UL search beams, then two UEs whose ULAPs collide must also be in very close proximity to each other, which further reduces the probability of ULAP collision. In one embodiment, a number of different pseudo-noise sequences are used by the UEs to spread their ULAPs, and a UE chooses one of the pseudo-noise sequences, randomly or according to a certain rule, for ULAP transmission. Use of different pseudo-noise sequences increases the probability of detection when multiple ULAPs overlap in time. In another embodiment, multiple sets of frequency resources are configured on the ARACH/RACH for ULAP/ULRP transmission, and a UE chooses one of the frequency resources, randomly or according to a certain rule, for ULAP transmission. In one embodiment, a UE, which does not receive a ULAP-ACK/ULRP-ACK within the LTI, retransmits the ULAP/ULRP with a randomly chosen delay to avoid collision with the ULAP that another UE may be transmitting.

As was described previously, once a BS detects a ULAP, the BS sends a ULAP-ACK on a DL dedicated control beam, formed using the UE-to-BS-AOA at which the ULAP was received. In one embodiment, in an OFDM based system, the ULAP-ACK is transmitted during a DL time slot following the reception of the ULAP, using a subset of the frequency tones and OFDM symbols of the time slot. In a variation of the embodiment, the frame timing of the DL dedicated control beam transmitting the ULAP-ACK is synchronized to that of the other DL dedicated data beams formed by the BS. If the DL dedicated control beam transmitting the ULAP-ACK overlaps with the DL dedicated data beams of the other UEs, then the DL dedicated control beam is assigned a set of frequency tones different from those of the adjacent beams, thereby avoiding cross-beam interference.

In some embodiments of an uplink-initiated initial access, a UE has not yet detected the DL signal prior to transmitting a first ULAP. Then, the UE does not have an estimate of the path losses to the BSs which will receive the ULAP transmitted by the UE; a mechanism is needed for setting the transmit power of the ULAP transmission. In one embodiment, the UE repeats the following procedure: the UE initially transmits a ULAP on a UE beam at a ULAP nominal transmit power, waits for an LTI time interval and if no ULAP-ACK is received within the LTI, then the UE increases its transmit power by a specified $\Delta_P$ and retransmits the ULAP on the same UE beam at the increased power; the UE retransmits the ULAP every LTI interval by increasing the transmit power by $\Delta_P$ for each retransmission until the UE receives a ULAP-ACK or the number of ULAP transmissions reaches a number $N_T$. In a variation of the embodiment, the nominal path loss is set to the smallest UE to BS 785 propagation loss in the UE's neighbor-set. In another variation of the embodiment, the ULAP nominal transmit power is set such that the product of the UE's EIRP and the nominal path loss be above a threshold.

Beam Tracking During Active Data Transmission Mode

As described previously, the current UE-to-BS-AOA is defined as the latest estimated AoA of the signals received at a BS from a UE. The UE antenna subsystem of mobile and portable devices may change orientation quickly as the user moves the device, thereby changing the UE beam boresight angular pointing position, resulting in the UE beam pointing away from the serving-BS. Moreover, as the UE's antenna orientation changes, there may be a large variation in the body loss that the UE antenna beam experiences toward the serving-BS. Even for stationary laptops, the propagation channel is, due to the movement of people in the surrounding area, slowly fading. Therefore, systems and methods are needed to track and update the BS's current UE-to-BS-AOA based on the signals received from the UE, to track and update the UE-serving-beam and the BS-serving-beam, and to initiate handover when the signal quality received from the serving-BS drops below a threshold.

During a data session, the BS transmits a DL Dedicated Reference Signal (DLDRS) on a DL dedicated data beam toward a UE, which the UE uses for data demodulation as well as for estimating the DL signal quality. In one embodiment, the UE transmits a ULRS signal which the serving-BS uses for data demodulation as well as for estimating the UL signal quality. Once a UE has established data connection with a BS, the BS needs to track the BS-serving-beam toward the UE as the UE moves or changes orientation. When a BS and a UE are continuously exchanging data, the BS may estimate the UE-to-BS-AoA by carrying out a spatial search of the received ULRS signal quality using a UL search beam around the current UE-to-BS-AOA, update the current UE-to-BS-AOA based on the UL search beam angular pointing position from which the highest signal quality is received, form DL and UL dedicated data beams using the updated current UE-to-BS-AOA and a beamforming algorithm, use the UL dedicated data beam to receive UL data from the UE and to transmit data to the UE on the DL dedicated data beam. In one embodiment, the UE also carries out a spatial search of the received DLDRS signal quality, and updates the UE-serving-beam to a UE beam angular pointing position from which the highest DLDRS signal quality is received. In another embodiment, the UE initiates a handover procedure if the signal quality of the received DLDRS drops below a threshold. The handover procedure must be completed quickly in order to maintain reliable data transmission continuity with low delay. Systems and methods for reliable and fast handover are described next.

Beam Tracking During the Idle Mode and the Data Inter-Burst Periods

A UE and its serving BS are in one of two main states, the active state when the UE and the serving-BS are exchanging data, and the idle mode state where there is a lull in the data transmission during a data session. In one embodiment, when a BS in idle mode state has data to send to a UE, the BS forms a DL dedicated data beam toward the UE using the current UE-to-BS-AOA, the BS synchronizes the DL timing of the said DL dedicated data beam to that of the BS's other DL beams, and sends DLDRS, DLDCCH and data on the said DL dedicated data beam. The UE synchronizes to the DLDRS, estimates the channel impulse response for the allocated frequency resources, and decodes the DL control information and data. In another embodiment, when a UE in idle mode state has data to transmit to a BS, the UE initiates data transmission on the UE-serving-beam, by either sending data on the RACH or by sending a resource request message on the RACH to reserve dedicated resources on the UL on which to transmit data. In one embodiment, during the idle mode state, time is divided into Sleep Time Intervals (STI), and a BS in the idle mode state that has data to transmit to a UE, starts data transmission at the STI boundary. In a variation of the embodiment, the UE goes to sleep during idle mode to save power, wakes up every STI to search for a DLDRS that the serving BS may be transmitting to start data transmission, detects the DLDRS, and decodes the DLDCCH and any data sent by the serving-BS. The idle mode ends and active mode begins when a BS or a UE begins data transmission. The STI duration may be chosen to meet the data transaction delay requirements, while maximizing the UE power saving. Therefore, data transmission during idle period may begin with very small delay.

The idle period between data transactions may take seconds or more. Even during a data transaction, in some applications such as web browsing, there may be inter-burst delays of 100s of milli-seconds and even seconds depending on a number of factors such as the server delays. As mentioned previously, the UE-serving-beam may change direction due to the user's hand and/or body movement. Even for stationary devices such as laptops, the UE-serving-beam may experience slow fading due to the user's movement, or movement of others near the UE. Therefore, during the idle periods the UE-serving-beam's gain toward the serving-BS may reduce significantly if the UE-serving-beam is not adjusted according to the UE's movements. If the UE has moved out of the BS-serving-beam's BW, then the BS-serving-beam's boresight may not be pointing toward the UE. Therefore, systems and methods are needed to update the BS-serving-beam and UE-serving-beam during the idle mode and the data inter-burst periods.

In idle mode, a downlink reference signal, referred to as DownLink Tracking Probe (DLTP), is periodically transmitted to the UE by the UE's serving-BS. The DLTP is transmitted every DLTP Periodicity Time Interval (DLTP-PTI). The UE uses the DLTP to estimate the DL signal quality. As will be described in the forthcoming embodiments, if the measured DLTP signal quality drops below a threshold, then the UE triggers a BS-serving-beam/UE-serving-beam update process, or a handover. In one embodiment, the DLTP comprises of a preamble that effectively carries one bit of information, the UE detects the preamble and measures its signal quality. In one embodiment, the serving-BS assigs a unique pseudo-noise sequence to the preamble of the DLTP transmitted to each idle mode UE that is communicating with the BS. In another embodiment, the serving-BS assigns a different time slot for the transmission of the DLTP for each idle mode UE. In another embodiment, in an OFDM based system, the BS assigns a different set of OFDM tones or symbols to the DLTP sent to the different UEs. The PTI duration depends, in part, on the speed of the UE.

In one embodiment for beam tracking during idle mode, the BS periodically, at the boundary of DLTP-PTI, forms a DL dedicated control beam, using the current UE-to-BS-AoA, toward a UE that is in idle mode with the BS, and transmits a DLTP to the UE. During idle period and data inter-burst periods, the UEs use the DLTP as reference signal for DL synchronization, DL signal quality measurement and beam tracking. Each UE wakes up every DLTP-TPI, sets a DLTP Wait Time Interval (DLTP-WTI) timer, and searches for the DLTP on the UE-serving-beam. If the UE does not detect a DLTP within the DLTP-WTI, the UE initiates the idle mode handover procedure. If the UE detects a DLTP signal within the DLTP-WTI, it estimates the signal quality of the detected DLTP, and initiates a handover procedure if the estimated DLTP signal quality is below a first threshold. If the UE detects a DLTP whose signal quality is below a second threshold then the UE transmits a ULRP on the UE-serving-beam to the serving-BS, the serving-BS carries out a spatial search of the ULRP and updates the current UE-to-BS-AOA. In another embodiment, the UE uses digital beamforming, stores the received DLTP samples in a memory buffer, does a spatial search of the DLTP samples to determine the UE beam angular pointing position at which the UE receives the DLTP with the highest signal quality, and chooses the said UE beam angular pointing position as the UE-serving-beam. The idle mode handover procedure follows the same steps as those of the handover procedures described in the previous embodiments.

In some embodiments, the UE is equipped with a UE positioning subsystem comprised of sensors such as accelerometers, gyroscopes and magnetometers. The UE positioning subsystem tracks the changes in the UE's orientation and position location coordinates with respect to a reference time. In one embodiment, the UE positioning subsystem tracks the changes in the UE orientation and position location coordinates, computes a metric of the changes in the UE's orientation and position location, and triggers a beam update process when the magnitude of the metric of the changes in the UE orientation or position location is a above a threshold. In a variation of the embodiment, the UE radio subsystem goes into sleep mode during idle periods, the UE positioning subsystem triggers the UE radio subsystem to wake up and begin a beam update process when the magnitude of the metric of the changes in the UE orientation or position location is a above a threshold. Examples of metrics of the UE orientation change are the sum of the changes in the azimuthal and elevation angles, and the maximum of the azimuthal or elevation angle changes. Examples of metrics of the UE position location coordinate change are the length of UE position location change, and the change in the horizontal position change. In another embodiment for idle mode beam tracking, in addition to the UE orientation and position location change based beam update trigger, a DLTP is also sent to the UE by the serving-BS every DPLS-PTI.

Figure 9:
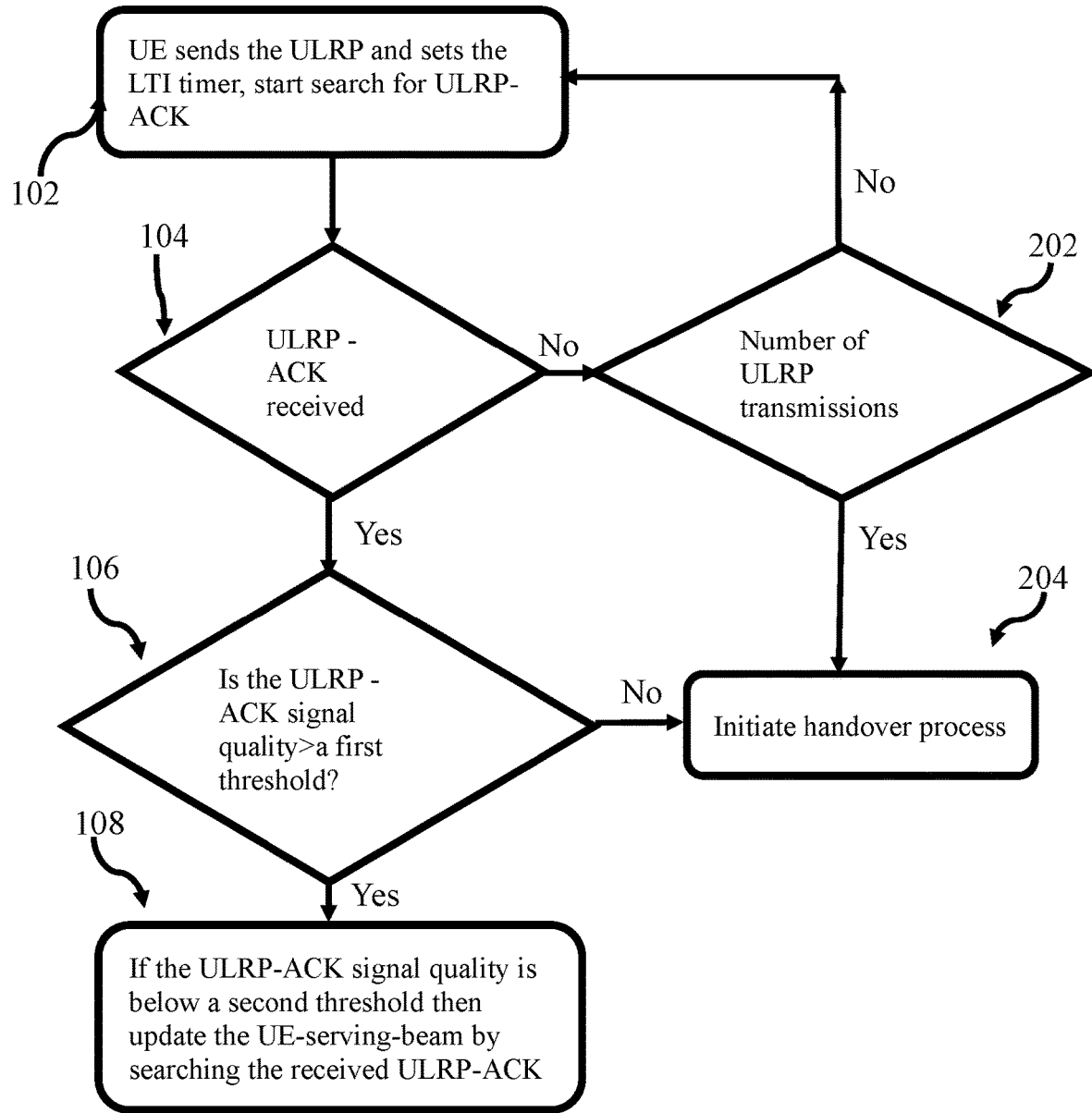
FIG. 9 is a flow chart of an exemplary beam update process during idle period, according to some embodiments.

In a UE positioning change based beam update embodiment, once the UE's orientation and position location changes trigger a beam update process, the UE begins the beam update process by sending a ULRP signal to the BS on the UE-serving-beam. The BS beam update process comprises of the BS searching for the ULRP, the BS carrying out a spatial search of the digital samples of a detected ULRP signal to determine the AoA at which the BS receives the ULRP with the highest signal quality, the BS updating the current UE-to-BS-AoA to the determined AoA, and the BS sending a ULRP-ACK to the UE on the BS-serving-beam. FIG. 9 is an exemplary flow chart of the UE steps of the UE positioning change based beam update embodiment. In step 102, the UE transmits a ULRP and sets the LTI timer, and begins the search for the ULRP-ACK. In step 104, if a ULRP-ACK has been received within the LTI, then the UE goes to step 106, otherwise the UE goes to step 202. In step 106, the UE initiates handover if the signal quality of the received ULRP-ACK is below a first threshold, otherwise the UE initiates the UE-serving-beam update process if the signal quality is below a second threshold. In step 202, if the number of transmissions of the ULRP exceeds a number $N_T$, then the UE initiates handover, otherwise the UE goes back to step 102. During the UE-serving-beam update process, the UE carries out a spatial search of the received digital samples of the ULRP-ACK message to determine the UE beam angular pointing position at which the ULRP-ACK is received with the highest signal quality and updates the UE-serving-beam angular pointing position to that of the determined UE beam angular pointing position.

Fast and Low Overhead Handover

During the active and idle modes, the BS transmits DLDRS and DLTP reference signals, on DL dedicated control and data beams, to the UE. The UE estimates the signal quality of the DLDRS and DLTP, and if the signal quality is below a threshold then the UE initiates handover. In one uplink-initiated handover embodiment, the UE steps comprise of the UE sequentially transmitting a UL reference signal on each UE beam, estimating the signal quality of the acknowledgements received from the BSs in response to the transmitted UL reference signals, and choosing, as handover-BS, a BS from which an acknowledgement with signal quality above a threshold is received. During the initial access and data session, the UE has synchronized to the DL, has decoded a DLDCCH, and has received information on the RACH resources of the UE's serving-BS as well as the BSs in the UE's handover-candidate-set. Then, during handover, the UE may transmit a UL reference signal on the RACH, referred to as the UpLink Handover Probe (ULHP). The ULHP includes the functionality of the ULAP. In some embodiments, the ULHP comprises of a single preamble that is spread using a modulation symbol pattern, or pseudo-noise sequence. In some embodiments, the ULHP comprises of a preamble and a payload carrying information such as the UE's identification. In some embodiments, the ULHP-ACK, the acknowledgement that the BS sends to the UE when a ULHP is received, comprises of a single preamble, effectively carrying one bit of information. In some embodiments, the ULHP preamble is spread using a BS specific pseudo-noise sequence. In some embodiments, the ULHP-ACK is comprised of a preamble and a payload that includes information such as the BS's identification.

Figure 8:
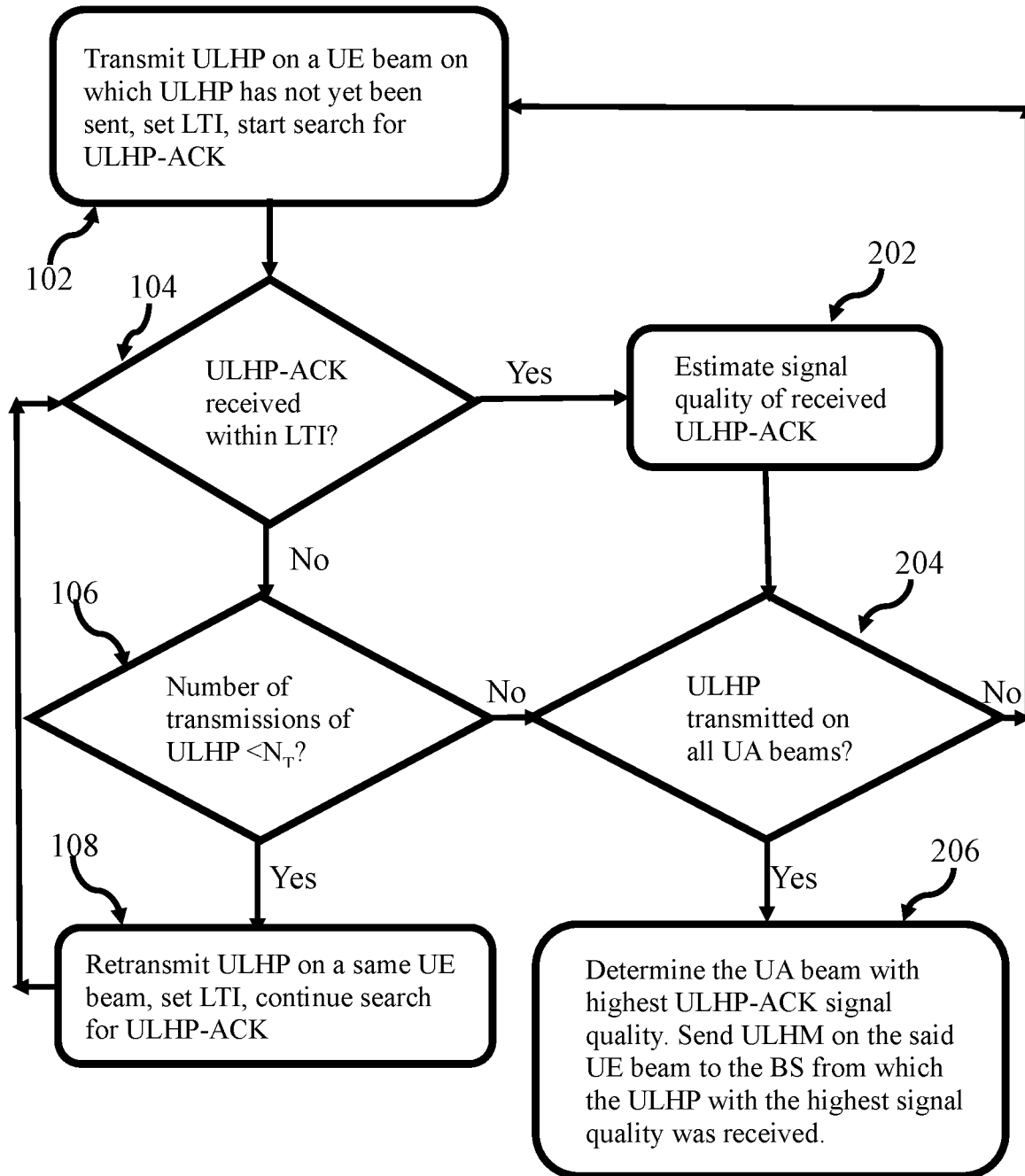
FIG. 8 is a flow chart of an exemplary uplink-initiated handover procedure, according to some embodiments.

FIG. 8 is an exemplary flow chart of the UE steps for an uplink-initiated handover procedure, according to one embodiment. In step 102, the UE transmits a ULHP on a beam on which a ULHP has not yet been transmitted, sets the LTI timer and begins the search for ULHP-ACK messages on the same UE beam. In step 104, the UE determines if a ULHP-ACK has been received within the LTI. If a ULHP-ACK is received within the LTI, then the UE, in step 202, estimates the signal quality of the received ULHP-ACK and goes to step 204. If a ULHP-ACK is not received within the LTI, then the UE, in step 106, determines if the number of the ULHP transmissions is below a number $N_T$; If the number of the ULHP transmissions is below $N_T$, then the UE retransmits the ULHP, sets the LTI, and begins the search for the ULHP-ACK and goes back to step 104, otherwise the UE moves to step 204. In step 204, if ULHPs have not been transmitted on all UE beams, then the UE goes back to step 102, otherwise the UE, in step 206, chooses the UE beam on which it has received the ULHP-ACK with the highest signal quality and transmits an UpLink Handover Message (ULHM) on the said UE beam, requesting handover. In a variation of the embodiment, the ULHP-ACK carries the BS's identification, the UE designates the BS from which the ULHP-ACK with the highest signal quality is received as the handover-BS, and sends a ULHM to the serving-BS, requesting that the serving-BS complete the handover between the UE and the handover-BS. In another variation of the embodiment, the ULHP-ACK carries the BS's identification, the UE sends the identity of each BS from which it has received a ULHP-ACK as well as the signal quality of each received ULHP-ACK to the serving-BS, requesting that the serving-BS, or the CC, choose a handover-BS and complete the handover to the handover-BS.

In another handover embodiment, the UE transmits a ULHP on a UE beam, sets the LTI timer and begins the search for the ULHP-ACK on the same UE beam. If a ULHP-ACK is not received within the LTI then the UE retransmits the ULHP on the same UE beam if the number of the ULHP transmissions is below a number $N_T$. If a ULHP-ACK is received within the LTI, then the UE estimates the signal quality of the received ULHP-ACK, and transmits a ULHM message if the signal quality is above a threshold, otherwise if ULHPs have not been transmitted on all UEs beams then the UE goes back to the step of transmitting a ULHP on another UE beam. In a variation of the embodiment, the ULHP-ACK carries the BS's identification, and the UE chooses, as the handover-BS, the BS from which it has received a ULHP-ACK with a signal quality above a threshold. In another variation of the embodiment, the UE transmits the ULHM to the handover-BS on the same UE beam on which the ULHP-ACK with the signal quality above a threshold was detected, requesting that the handover-BS complete the handover. In another variation of the embodiment, the UE transmits the ULHM, which contains the identity of the handover-B S, on the UE-serving-beam to the serving-B S, requesting that the serving-BS complete the handover to the handover-BS.

In another handover embodiment, the UE sends a message to the serving-BS that includes the UE's position location coordinates and informs the serving-BS that the handover procedure has been initiated, the serving-BS forwards the message to the CC, and the CC requests that the BSs in the UE's neighbor-set transmit a ULHP-ACK to the UE. Each BS in the neighbor-set computes the UE-to-B S-AoA using the position locations of the UE and the BSs, forms a DL dedicated control beam toward the UE using the UE-to-BS-AoA, and transmits a ULHP-ACK on the DL dedicated control beam. The UE, searches for ULHP-ACKs on all its beams, estimates the signal quality of the received ULHP-ACKs, chooses the UE beam on which the ULHP-ACK with the highest signal quality is received, and sends a ULHM on the said UE beam requesting handover. In a variation of the embodiment, the ULHP-ACKs carry information regarding the BS's identification, the UE chooses the BS from which it has received the ULHP-ACK with the highest signal quality as the handover-BS, and the UE sends a ULHM to the serving-BS including the identity of the handover-BS, requesting handover to the handover-BS. In a variation of the embodiment, the UE sends the ULHM to the handover-BS requesting handover. In another variation of the embodiment, the UE sends a message to the serving-BS with the signal quality estimate of the ULHP-ACKs received from the BSs in the handover-candidate-set; the serving-BS, or the CC, determines the handover-BS and completes the handover process. In another variation of the embodiment, the BS that completes the handover informs the CC of the handover completion, and the CC sends a message to each BS in the neighbor-set requesting that the BS stop transmitting the ULHP-ACK.

In one handover embodiment for fixed UE devices, the UE in a first step transmits a ULHP to a BS in the handover-candidate-set to which a ULHP has not yet been transmitted, sets the LTI timer and begins the search for the ULHP-ACK on the same UE beam on which the ULHP was sent. If a ULHP-ACK is not received within the LTI, then if the number of the ULHP transmissions is below a number $N_T$ the UE retransmits the ULHP to the same BS. If a ULHP-ACK is received, then the UE estimates the signal quality of the received ULHP-ACK. Next, the UE goes back to the first step of transmitting a ULHP to another BS in the handover-candidate-set if ULHPs have not been transmitted to all the BSs in the handover-candidate-set, otherwise the UE chooses, as handover-BS, the BS from which it has received the ULHP-ACK with the highest signal quality, and transmits a ULHM message to the handover-BS requesting that the said BS complete the handover. In a variation of the embodiment, the UE sends a ULHM message to the serving-BS, using the UE-serving-beam, requesting that the serving-BS complete the handover. In another variation of the embodiment, the UE sends a message to the serving-BS with the signal quality estimate of the ULHP-ACKs received from the BSs in the handover-candidate-set; the serving-BS, or the CC, determines the handover-BS and completes the handover process.

What is claimed is:

1. A system for initial access by a user equipment (UE), the system comprising:
   the UE; and a plurality of base stations (BSs),
   wherein the UE is capable of forming at least two UE beams,
   the UE and the plurality of BSs repeat:
   the UE transmits an uplink reference signal on one of the at least two UE beams via an asynchronous random access channel (RACH);
   the UE transmits another uplink reference signal on another of the at least two UE beams via a synchronous RACH;
   each BS of the plurality of BSs estimates an Angle of Arrival (AoA) of the uplink reference signal and the another uplink reference signal;
   each BS of the plurality of BSs forms a dedicated downlink beam pointed toward the AoA;
   each BS of the plurality of BSs sends respective acknowledgement messages on the dedicated downlink beam carrying a BS' identification;
   the UE receives the respective acknowledgement messages from each BS of the plurality of BSs;
   the UE measures a corresponding signal quality of each of the acknowledgement messages;
   the UE extracts the BS' identification from each of the acknowledgement messages;
   the UE determines one BS of the plurality of BSs from which an acknowledgement message with a highest signal quality is received; and
   the UE transmits a connection setup message to the one BS of the plurality of BSs, the connection setup message carrying the BS' identification,
   wherein the UE receives, from a second network, information on resources of the synchronous RACH of a first network including a first plurality of BSs,
   the second network includes a second plurality of BSs,
   the plurality of BSs includes the first plurality of BSs and the second plurality of BS,
   the first network, the second network and the UE are synchronized one to another, and
   the UE transmits the another uplink reference signal via the synchronous RACH of the first network.

2. System of claim 1, wherein each of the respective acknowledgement messages comprises a preamble and a payload carrying the BS' identification of each BS of the plurality of BSs.

3. A method for initial access, comprising:
   transmitting, by a user equipment (UE), an uplink reference signal on one of at least two UE beams via an asynchronous random access channel (RACH);
   the UE transmits another uplink reference signal on another of the at least two UE beams via a synchronous RACH;
   estimating, by each of the plurality of base stations (BSs), an Angle of Arrival (AoA) of the uplink reference signal and the another uplink reference signal;
   forming, by each BS of the plurality of BSs, a dedicated downlink beam pointed toward the AoA;
   sending, by each BS of the plurality of BSs, respective acknowledgement messages on the dedicated downlink beam carrying a BS' identification;
   receiving, by the UE, the respective acknowledgement messages from each of the plurality of BSs;
   determining, by the UE, the BS's identification of each BS of the plurality of BSs;
   measuring, by the UE, a corresponding signal quality of each of the plurality of BSs;
   choosing, by the UE, one BS of the plurality of BSs from which an acknowledgement message with a highest signal quality is received; and
   transmitting, by the UE, a connection setup message to the one BS of the plurality of BSs, the connection setup message carrying the BS' identification.

4. Method of claim 3, further comprising, transmitting, by the UE, the connection setup request message on a UE beam on which the acknowledgement message with the highest signal quality is received.

5. Method of claim 3, further comprising:
   estimating, by the UE, respective signal qualities of the respective acknowledgement messages on multiple UE beam angular pointing positions; and
   choosing, by the UE, the UE beam angular pointing position on which a highest signal quality is received as a UE beam boresight.

6. System of claim 1, wherein the uplink reference signal comprises a single preamble, spread using a pseudo-noise sequence.

7. System of claim 1, wherein the uplink reference signal comprises a preamble and a payload.

8. System of claim 1, wherein dedicated resources are assigned to the asynchronous random-access channel for transmitting the uplink reference signal.

9. System of claim 1, wherein the uplink reference signal is transmitted on a set of resources of the asynchronous random-access channel, where the set of resources are also assigned to other data or control channels.

10. System of claim 1, wherein:
each BS of the plurality of BSs periodically transmits, on shared downlink beams covering a sector, information on resources of the asynchronous random-access channel resources; and
the UE detects the shared downlink beams and obtains the information on the resource of the asynchronous random-access channel resources.

11. System of claim 1, wherein each of the respective acknowledgement messages comprises a single preamble, spread using a pseudo-noise sequence.

12. System of claim 1, wherein each of the respective acknowledgement messages comprises a single preamble, spread using a pseudo-noise sequence specific to the BS' identification.

13. System of claim 1, wherein the UE transmits the connection setup request message on a UE beam on which the acknowledgement message with the highest signal quality is received.

* * * * *